United States Patent
Inoshita et al.

(10) Patent No.: US 11,622,423 B2
(45) Date of Patent: Apr. 4, 2023

(54) INDUCTION COOKER AND SENSOR UNIT

(71) Applicant: Mitsubishi Electric Corporation, Tokyo (JP)

(72) Inventors: Chizuru Inoshita, Tokyo (JP); Akira Morii, Tokyo (JP); Hayato Yoshino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 535 days.

(21) Appl. No.: 16/603,745

(22) PCT Filed: Jun. 16, 2017

(86) PCT No.: PCT/JP2017/022288
§ 371 (c)(1),
(2) Date: Oct. 8, 2019

(87) PCT Pub. No.: WO2018/229967
PCT Pub. Date: Dec. 20, 2018

(65) Prior Publication Data
US 2020/0100332 A1    Mar. 26, 2020

(51) Int. Cl.
*H05B 6/64* (2006.01)
*H05B 6/12* (2006.01)

(52) U.S. Cl.
CPC ......... *H05B 6/6455* (2013.01); *H05B 6/1254* (2013.01); *H05B 6/1263* (2013.01)

(58) Field of Classification Search
CPC .. H05B 2213/07; H05B 6/062; H05B 6/1254; H05B 6/1263; H05B 6/1272; H05B 6/6455; Y02B 40/00

USPC ............... 219/711, 620–627, 663–668, 494; 99/DIG. 14, 325, 451
See application file for complete search history.

(56) References Cited

U.S. PATENT DOCUMENTS 8,203,106 B2 *  6/2012  Kataoka ............... H05B 6/1209
                                                                 219/622
2005/0242088 A1   11/2005  Takada et al.
2016/0113070 A1   4/2016   Suzuki et al.

FOREIGN PATENT DOCUMENTS

| EP | 2 410 815 A1 | 1/2012 |
| EP | 3 119 162 A1 | 1/2017 |
| JP | 2005-026162 A | 1/2005 |
| JP | 2009-158340 A | 7/2009 |
| JP | 2009-266506 A | 11/2009 |
| JP | 2010-114017 A | 5/2010 |

(Continued)

OTHER PUBLICATIONS

Extended European Search Report dated May 25, 2020 issued in corresponding EP application No. 17913229.5.

(Continued)

*Primary Examiner* — Quang T Van
(74) *Attorney, Agent, or Firm* — Posz Law Group, PLC

(57) ABSTRACT

An induction cooker includes a top plate on which a cooking container is placed; a heating coil placed below the top plate and that heats the cooking container; an infrared sensor placed below the heating coil and that detects infrared radiation emitted from the cooking container; a sensor casing that houses the infrared sensor; and a magnetic path forming member placed on a top face of the sensor casing. The magnetic path forming member guides magnetic flux passing above the infrared sensor by being generated from the heating coil.

22 Claims, 19 Drawing Sheets

(56) References Cited

FOREIGN PATENT DOCUMENTS

| JP | 2011-009035 A | 1/2011 |
|---|---|---|
| JP | 2015-84306 A | 4/2015 |

OTHER PUBLICATIONS

Office Action dated Nov. 10, 2020 issued in corresponding JP patent application No. 2019-524688 (and English translation).
Japanese Office Action dated Jan. 26, 2021, issued in corresponding JP Patent Application No. 2019-524688 (and English Machine Translation).
Office Action dated May 26, 2021 issued in corresponding CN patent application No. 201780091197.6 (and English translation).
Office Action dated Oct. 15, 2021 issued in corresponding CN patent application No. 201780091197.6 (and Machine Translation).
Office Action dated Dec. 22, 2021 issued in corresponding European patent application No. 17913229.5.
Office Action dated Jan. 29, 2022 issued in corresponding CN patent application No. 201780091197.6 (and English machine translation).
International Search Report of the International Searching Authority dated Sep. 12, 2017 for the corresponding International application No. PCT/JP2017/022288 (and English translation).

\* cited by examiner

TRANSMISSION CHARACTERISTICS OF TOP PLATE

RELATIONSHIP BETWEEN SPECTRAL TRANSMISSION CHARACTERISTICS OF TOP PLATE AND SPECTRAL RADIANCE CURVES AT VARIOUS TEMPERATURES

INDUCTION COOKER AND SENSOR UNIT

CROSS REFERENCE TO RELATED APPLICATION

This application is a U.S. national stage application of PCT/JP2017/022288 filed on Jun. 16, 2017, the contents of which are incorporated herein by reference.

TECHNICAL FIELD

The present invention relates to an induction cooker and a sensor unit provided with a sensor configured to sense temperature of a cooking container.

BACKGROUND ART

In recent years, an induction cooker configured to heat food to be cooked using an induction heating method has been brought into widespread use. The induction cooker is designed to generate an eddy current in a cooking container body placed above a heating coil via a top plate using magnetic flux generated when an electric current is passed through a metal body such as the heating coil placed in the cooker and generate heat in a cooking container using Joule heat generated by resistance of the cooking container body.

A thermistor method and an infrared sensor method have hitherto been known as methods for detecting temperature of the cooking container body, which is an object to be heated placed on the top plate of the induction cooker, where the thermistor method uses a thermistor, which is a contact temperature sensor and the infrared sensor method uses an infrared sensor, which is a noncontact temperature sensor. The thermistor method detects the temperature transmitted from the cooking container through the top plate with the thermistor placed in contact with the top plate. The infrared sensor method detects infrared radiation energy emitted from the cooking container placed on the top plate, using the infrared sensor placed below the heating coil and calculates the temperature of the cooking container from an amount of detected infrared energy.

With the infrared sensor method, as part of the magnetic flux generated from the heating coil enters the infrared sensor, high frequency noise is superposed on output of the infrared sensor, making the output unstable. Consequently, there is a problem in that temperature detection accuracy of the cooking container lowers, deteriorating the accuracy of precise-temperature cooking or automatic cooking function as well. To solve this problem, provision of a magnetic shielding unit around the infrared sensor has been proposed.

For example, Patent Literature 1 proposes to house a pyroelectric noncontact temperature sensor in a casing made of a magnetic substance. With a configuration disclosed in Patent Literature 1, as an AC magnetic flux generated by the heating coil intersects the magnetic substance placed around the noncontact temperature sensor, an eddy current flows in the magnetic substance. Then, magnetic flux is generated by the eddy current, cancelling out magnetic flux entering the noncontact temperature sensor and thereby preventing superposition of high frequency noise in the noncontact temperature sensor.

Also, Patent Literature 2 proposes to cover an infrared sensor and a control board with a magnetic shielding element made of aluminum. When a metal is used for a magnetic shielding element as with Patent Literature 2, an AC magnetic flux generated by a heating coil intersects the metal as with Patent Literature 1, causing an eddy current to flow. Then, the eddy current cancels out magnetic flux entering the infrared sensor, thereby preventing superposition of high frequency noise.

Furthermore, Patent Literature 3 proposes a casing of an infrared sensor made from a ferrite resin. Ferrite is an insulator, and no eddy current is generated even if ferrite intersects magnetic flux unlike Patent Literature 1 and Patent Literature 2. A configuration disclosed in Patent Literature 3 guides magnetic flux entering an infrared sensor by using magnetic permeability of ferrite and thereby prevents superposition of high frequency noise on the infrared sensor. Also, according to Patent Literature 3, by mixing a ferrite component in a resin, moldability and molding accuracy of the casing can be improved.

CITATION LIST

Patent Literature

Patent Literature 1: Japanese Unexamined Patent Application Publication No. 2009-158340
Patent Literature 2 Japanese Unexamined Patent Application Publication No. 2005-26162
Patent Literature 3: Japanese Unexamined Patent Application Publication No. 2011-9035

SUMMARY OF INVENTION

Technical Problem

Here, when an eddy current generated in a magnetic shielding unit is used as described in Patent Literature 1 and Patent Literature 2, an eddy current is generated if the magnetic flux intersecting the magnetic shielding unit has a relatively high frequency, but no eddy current is generated if the magnetic flux has a relatively low frequency. Therefore, if the magnetic flux intersecting the magnetic shielding unit has a relatively low frequency, magnetic flux, which has a possibility of cancelling out the magnetic flux entering the casing of the noncontact temperature sensor, is not generated, thus resulting in a reduced magnetic shielding effect.

Also, the magnetic flux generated in a magnetic substance or a metal varies with the electrical conductivity and thickness of the magnetic substance or a metal. Also, because of losses caused by energy conversion at various stages in generating an eddy current from magnetic flux and generating magnetic flux from the eddy current as well as because of heat-energy losses due to Joule heat generated by the eddy current and resistance of electric conductors, it may be impossible to generate magnetic flux strong enough to cancel out all incident magnetic flux.

Also, the ferrite resin used in Patent Literature 3 is a magnetic material effective for high frequencies of about a few hundred MHz to a few GHz. In contrast, a driving frequency band for induction cookers is 20 KHz to 100 KHz. The relative permeability of a ferrite resin in the driving frequency band for induction cookers is far lower than in high frequency bands. For example, relative permeability of a ferrite resin at 10 KHz is about 10. Therefore, when a ferrite resin is used for a magnetic shielding unit, it is necessary to place a large amount of a ferrite resin around the infrared sensor, such as making the entire sensor casing from a ferrite resin as with Patent Literature 3. This will result in an increased product cost.

Furthermore, to accurately position the infrared sensor, which is an optical component, it is necessary to mold the sensor casing accurately. If molding accuracy of the sensor casing is low, a distance between the infrared sensor and the top plate cannot be stabilized, and detection accuracy will be affected as well. However, when a ferrite resin is used as with Patent Literature 3, because a metal is mixed in the resin, durability of a mold during molding of the sensor casing is reduced and it is necessary to take into consideration the influence of magnetic fields during molding. This will lead to increases in cost during production.

The present invention has been made to solve the above problem and an object thereof is to provide an induction cooker and a sensor unit that can reduce penetration of magnetic flux into an infrared sensor without incurring increases in cost.

Solution to Problem

A cooker according to one embodiment of the present invention comprises: a top plate on which a cooking container is placed; a heating coil placed below the top plate and configured to heat the cooking container; an infrared sensor placed below the heating coil and configured to detect infrared radiation emitted from the cooking container; a sensor casing configured to house the infrared sensor; and a magnetic path forming member placed on a top face of the sensor casing, wherein the magnetic path forming member guides magnetic flux generated from the heating coil and passing above the infrared sensor.

A sensor unit according to another embodiment of the present invention comprises: a sensor; a sensor casing configured to house the sensor; and a magnetic path forming member placed on a top face of the sensor casing and configured to guide magnetic flux passing above the sensor.

Advantageous Effects of Invention

Since the magnetic path forming member placed on the top face of the sensor casing guides the magnetic flux passing above the infrared sensor, the induction cooker and a sensor unit according to embodiments of the present invention can reduce penetration of the magnetic flux into the infrared sensor using a simple structure without incurring increases in cost. This makes it possible to prevent superposition of noise on the infrared sensor and improve temperature detection accuracy of the infrared sensor.

DESCRIPTION OF EMBODIMENTS

Embodiments of a cooker according to the present invention will be described below with reference to the drawings. Note that a detailed structure and redundant or similar descriptions are simplified or omitted as appropriate.

Embodiment 1

(Configuration of Induction Cooker)

Figure 1:
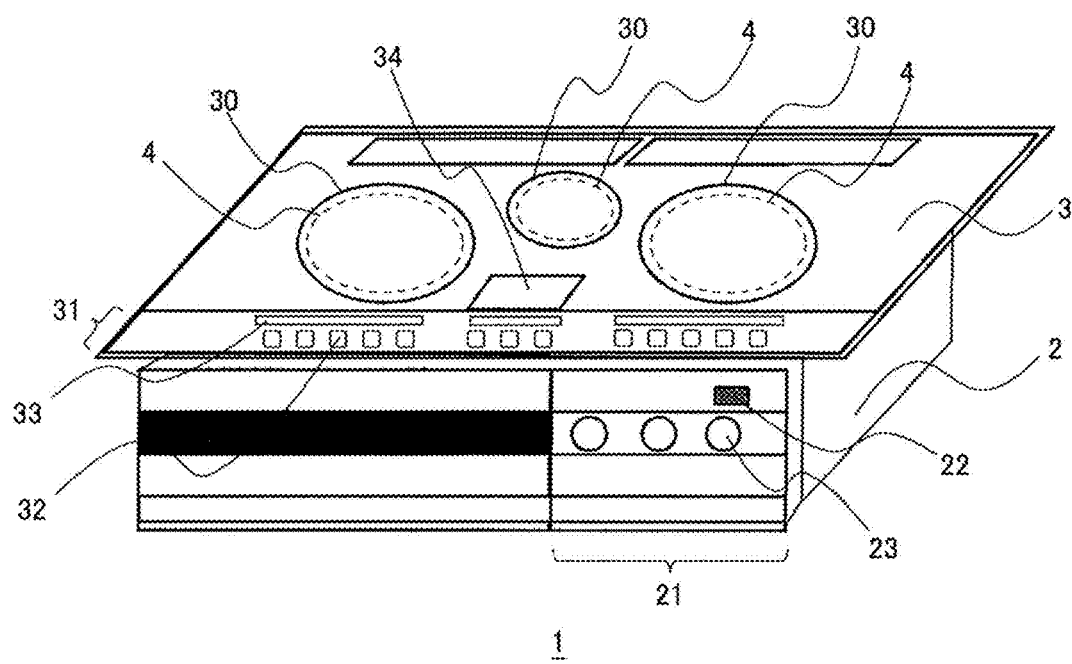
FIG. 1 is a schematic perspective view of an induction cooker according to Embodiment 1.

First, a configuration of an induction cooker 1 will be described. FIG. 1 is a schematic perspective view of the induction cooker 1 according to Embodiment 1. As shown in FIG. 1, the induction cooker 1 includes a main body 2 and a top plate 3 placed on a top face of the main body 2. A front operation panel 21 is provided on a front face of the main body 2. A power switch 22 used to turn on and off the induction cooker 1 and plural operation dials 23 used to adjust heating power are placed on the front operation panel 21.

The top plate 3 includes, for example, a heat-resistant glass plate and a metal frame. Plural (three in the present embodiment) circular cooking zones 30 indicating heating areas are printed or otherwise marked on a top face of the top plate 3. A cooking container 100 (FIG. 2) such as a pot or a frying pan is placed on each of the cooking zones 30. Also, heating coils 4 are placed under the cooking zones 30.

A top operation panel 31 used to regulate the heating power of the cooking zones 30 is provided on the front side of the top plate 3. The top operation panel 31 includes heating power regulators 32 used to adjust heating powers and heating power indicators 33 configured to indicate the magnitude of heating power. According to the present embodiment, plural heating power regulators 32 and plural heating power indicators 33 are provided for the respective cooking zones 30. Each of the heating power regulators 32 includes, for example, of a capacitive touch sensor. Each of the heating power indicators 33 includes, for example, plural light emitting diodes (LED) and as many light emitting diodes as appropriate to indicate the magnitude of heating power are lit up.

Also, a display unit 34 is provided in the center on the front side of the top plate 3. The display unit 34 includes, for example, a touch panel and is configured to display information on the induction cooker 1 and accept input of a cooking mode selection, a cooking temperature setting, and other actions. The information displayed on the display unit 34 includes setting information on the induction cooker 1, cooking mode selection information, information on progress of automatic cooking, information on temperature of the cooking container 100, and warning information.

Figure 2:
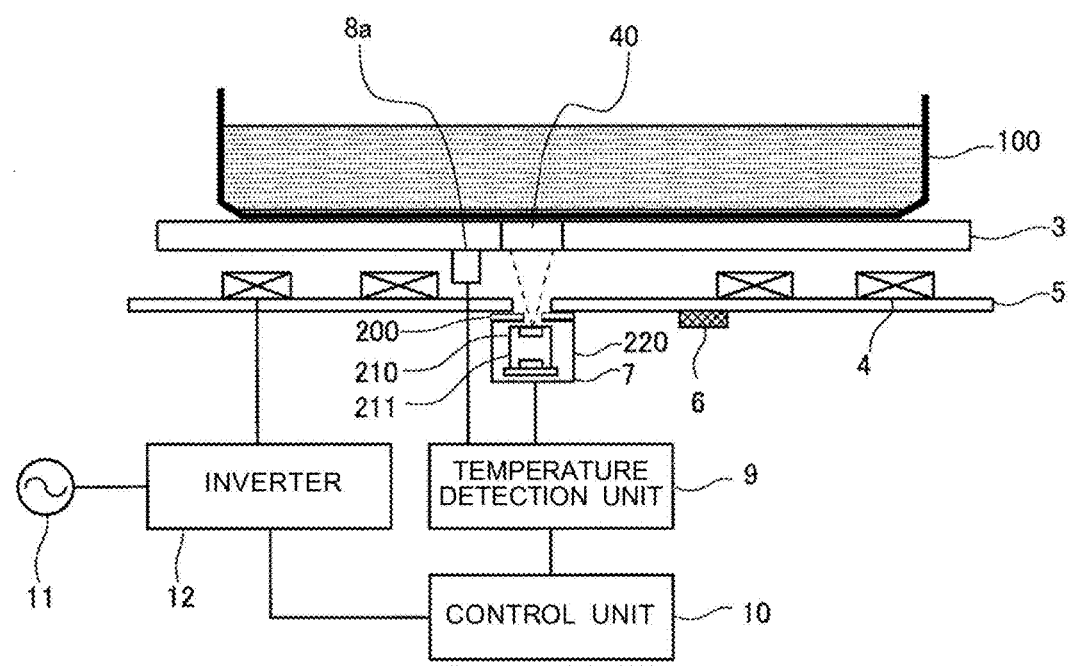
FIG. 2 is a schematic configuration diagram of principal part of the induction cooker according to Embodiment 1.
Figure 3:
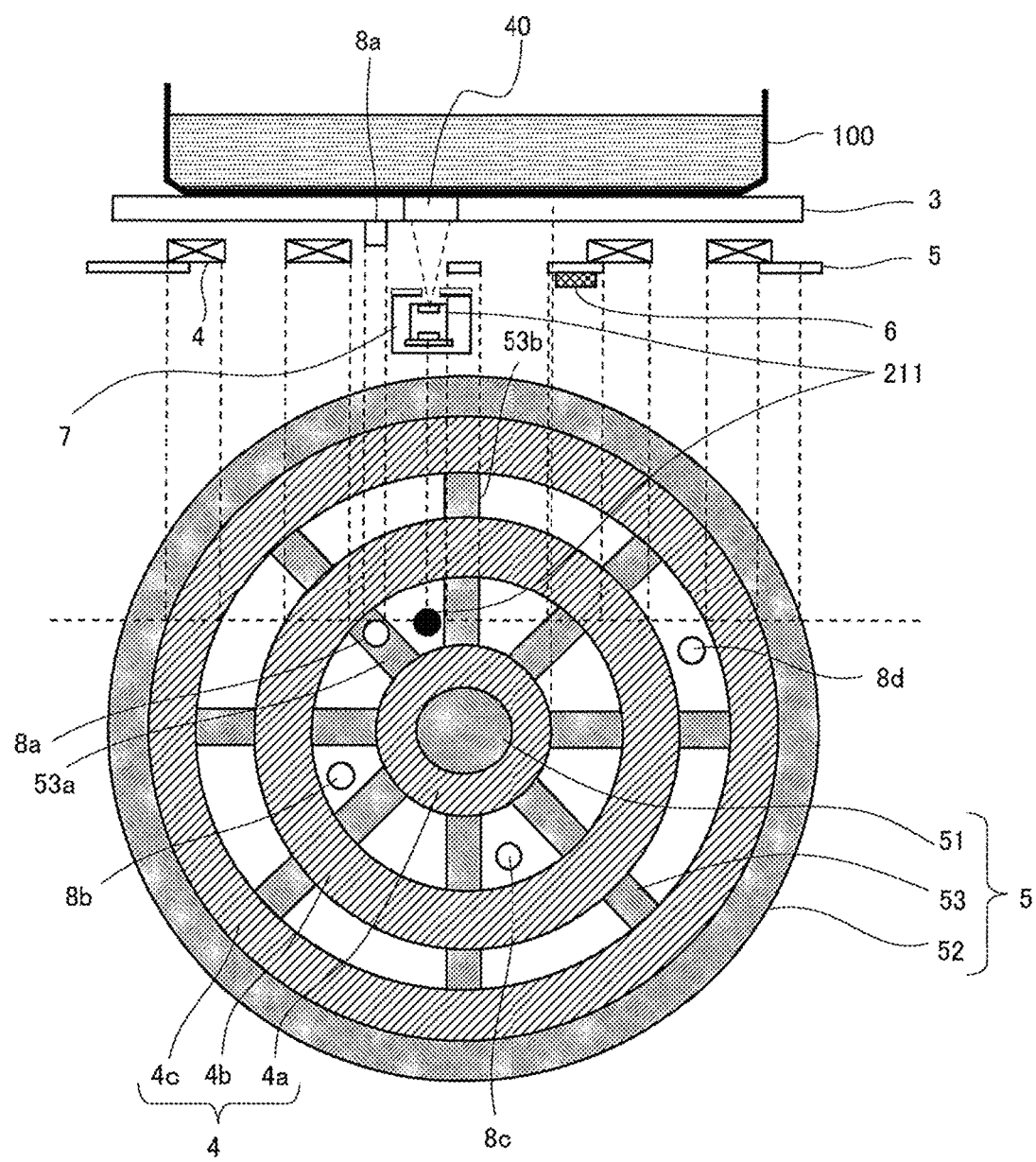
FIG. 3 is a diagram explaining a positional relationship in the principal part of the induction cooker according to Embodiment 1.
Figure 4:
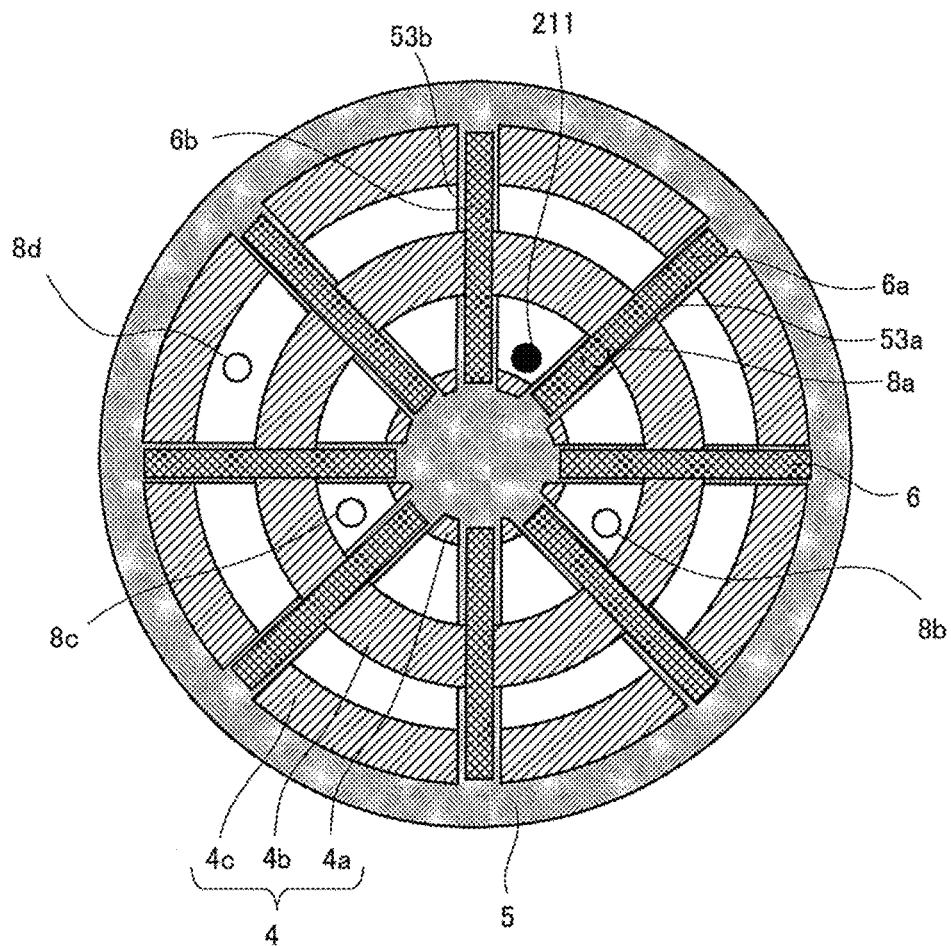
FIG. 4 is a diagram explaining a positional relationship in the principal part of the induction cooker according to Embodiment 1.

FIG. 2 is a schematic configuration diagram of principal part of the induction cooker 1 according to the present embodiment. Also, FIGS. 3 and 4 are diagrams explaining positional relationships in the principal part of the induction cooker 1 according to the present embodiment. Here, FIG. 3 includes a schematic sectional view of the induction cooker 1 and a schematic diagram of the heating coil 4 as viewed from above, where corresponding components are connected by broken lines. Also, FIG. 4 is a schematic diagram of the heating coil 4 as viewed from the back side.

As shown in FIGS. 2 to 4, the following components are provided below the top plate 3 inside the main body 2 of the induction cooker 1: the heating coil 4, a coil base 5 configured to support the heating coil 4, plural ferrite cores 6 placed on an underside of the coil base 5, a noncontact temperature sensor 7, plural contact temperature sensors 8a, 8b, 8c, and 8d, a temperature detection unit 9, a control unit 10, and an inverter 12.

As shown in FIG. 2, a transparent part 40 is provided in the top plate 3 right above the noncontact temperature sensor 7. Desirably, the transparent part 40 is a cavity or a transparent material such that infrared radiation of the cooking container 100 will pass through the top plate 3. However, if the transparent part 40 is a cavity or a transparent material, the heating coil 4 and wiring inside may be seen through the top face of the top plate 3, which is undesirable from the standpoint of design. Therefore, a dot pattern or a stripe pattern may be applied to the transparent part 40 to limit a proportion of a transparent area. This will guarantee design and functionality.

The heating coil 4 is placed under each of the cooking zones 30 provided on the top plate 3. The heating coil 4, which is a circular coil formed by winding a conductor such as a copper wire or an aluminum wire, generates a high-frequency magnetic field when supplied with high-frequency current. According to the present embodiment, the heating coil 4 is a triple-ring coil made up of a first coil 4a, a second coil 4b, and a third coil 4c. Also, the first coil 4a, second coil 4b, and third coil 4c are electrically connected to one another and driven by the same inverter 12. Note that the shape of the heating coil 4 and configuration of the drive circuit are not limited to this. For example, the shape of the heating coil 4 may be elliptical. Also, the coil may have a double-ringed, quadruple- or more multiple-ringed construction or may be made from a combination of plural coils. Also, the segments making up the coil do not have to be electrically connected to one another and may be driven independently by respective inverters.

The coil base 5 is made of a synthetic resin or other material, and is a generally disk-shaped element configured to house and support the heating coil 4. As shown in FIG. 3, the coil base 5 has a substantially circular shape and includes a central portion 51 configured to fit in the center of a winding of the heating coil 4, an outer peripheral portion 52 provided concentrically with the central portion 51 and configured to surround an outer peripheral side of the heating coil 4, and beams 53 configured to link together the central portion 51 and outer peripheral portion 52 in a radial direction. According to the present embodiment, eight beams 53 are provided radially.

The ferrite cores 6 are bar-shaped elements made of a non-conductive, high-permeability, ferromagnetic material. For example, the ferrite cores 6 are made of a soft ferrite described later. The ferrite cores 6 inhibit downward leakage flux from the heating coil 4, making it possible to improve heating efficiency and uniformly heat the cooking container 100. As shown in FIG. 4, the ferrite cores 6 according to the present embodiment are placed uniformly on undersides of the respective beams 53 by being spaced away from one another and extending radially from around the center of the heating coil 4.

The noncontact temperature sensor 7 is designed to detect infrared energy emitted from the bottom portion of the cooking container 100 placed on the top plate 3, and includes a magnetic path forming member 200, an infrared sensor unit 210 including an infrared sensor 211, and a sensor casing 220. In the radial direction, the noncontact temperature sensor 7 is placed such that the infrared sensor 211 will be located between the first coil 4a and the second coil 4b. In a circumferential direction, the noncontact temperature sensor 7 is placed such that the infrared sensor 211 will be located between ferrite cores 6 (i.e., between beams 53) placed radially. Here, of the plural ferrite cores 6, it is assumed that the ferrite cores 6 next to the infrared sensor 211 are the ferrite cores 6a and 6b. Similarly, of the beams 53 of the coil base 5, it is assumed that the beams 53 next to the infrared sensor 211 are the beams 53a and 53b. The noncontact temperature sensor 7 will be described in detail later.

The contact temperature sensors 8a, 8b, 8c, and 8d are placed in contact with an undersurface (i.e., a surface opposite to the heating coil 4) of the top plate 3 by respective non-illustrated sensor holders. The contact temperature sensors 8a, 8b, 8c, and 8d detect temperatures of the top plate 3. As shown in FIGS. 3 and 4, of the plural contact temperature sensors, the contact temperature sensor 8a is placed between the first coil 4a and the second coil 4b in the radial direction. Also, in the circumferential direction and above the ferrite core 6a next to the infrared sensor 211, the contact temperature sensor 8a is placed near that part of the beam 53a located next to the infrared sensor 211 that is on the side of the top plate 3 (on the side opposite to the ferrite core 6a). Also, in the radial direction, the contact temperature sensors 8b and 8c are placed on the same circle as the contact temperature sensor 8a concentrically with the center of the heating coil 4 while in the circumferential direction, the contact temperature sensors 8b and 8c are placed in a region different from the region in which the infrared sensor 211 is placed. Also, in the radial direction, the contact temperature sensor 8d is placed between the second coil 4b and the third coil 4c while in the circumferential direction, the contact temperature sensor 8d is placed in a region different from the region in which the infrared sensor 211 is placed.

Note that the number and arrangement of contact temperature sensors are not limited to this. For example, whereas the present embodiment is configured to include four contact temperature sensors, the number of contact temperature sensors may be three or less, or five or more. Also, it is sufficient that the contact temperature sensor 8a is placed near the infrared sensor 211, and a plurality of other contact temperature sensors may be placed at any locations such as a location that is near a location where the heating coil 4 is hottest or on the same circle as the contact temperature sensor 8a concentrically with the center of the heating coil 4.

Referring to FIG. 2 again, the temperature detection unit 9 includes hardware such as a circuit device implementing functions of the temperature detection unit 9, or an arithmetic unit such as a microcomputer and software run on the arithmetic unit. The temperature detection unit 9 receives output values from the infrared sensor 211 and contact temperature sensors 8a, 8b, 8c and 8d, and calculates the temperature of the cooking container 100 based on the received output values. Specifically, the temperature detection unit 9 corrects an output value of the infrared sensor 211 with a maximum value of the output values of the contact temperature sensors 8a, 8b, 8c, and 8d, and calculates a maximum temperature Tcmax of the cooking container 100. Also, the temperature detection unit 9 corrects the output value of the infrared sensor 211 with the output value of the contact temperature sensor 8a placed above the ferrite core 6a located next to the infrared sensor 211, and calculates a cooking control temperature Tcook of the cooking container 100.

The control unit 10 includes hardware such as a circuit device implementing functions of the control unit 10, or an arithmetic unit such as a microcomputer and software run on the arithmetic unit. Based on settings made via the front operation panel 21 or the top operation panel 31, the control unit 10 controls operation of the induction cooker 1. Also, the control unit 10 performs heating control by controlling the inverter 12 based on the cooking temperature set by a user, the maximum temperature Tcmax of the cooking container 100 calculated by the temperature detection unit 9, and the cooking control temperature Tcook.

The inverter 12 is a drive circuit configured to convert an AC power supply of a commercial power supply 11 into a high-frequency current and supply the high-frequency current to the heating coil 4. Note that the induction cooker 1 may include components other than those shown in FIG. 2, and may be equipped, for example, with a communication unit configured to communicate with external devices. Also, the control unit 10 may be configured to include a function of the temperature detection unit 9.

(Spectral Transmission Characteristics of Top Plate)

Figure 5:
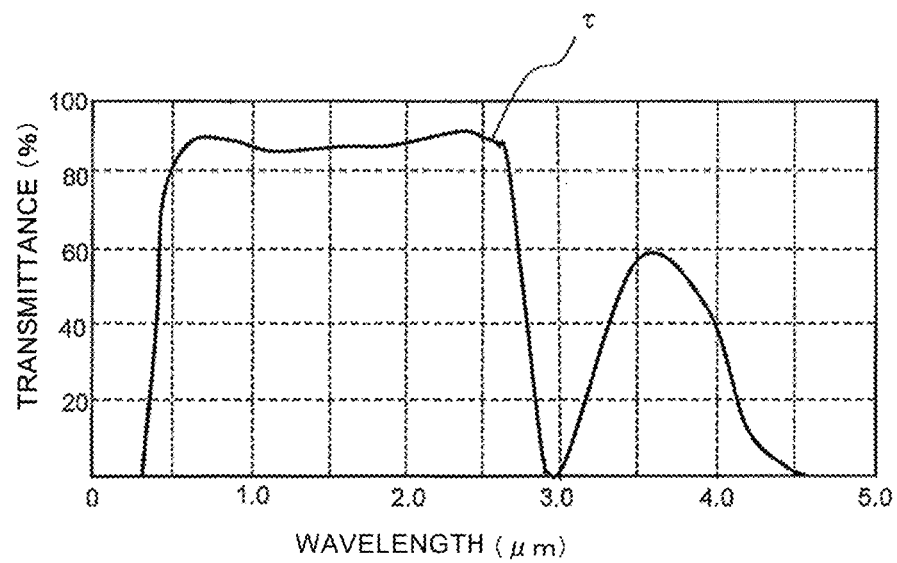
FIG. 5 is a graph showing spectral transmission characteristics of a top plate in the induction cooker according to Embodiment 1.
Figure 6:
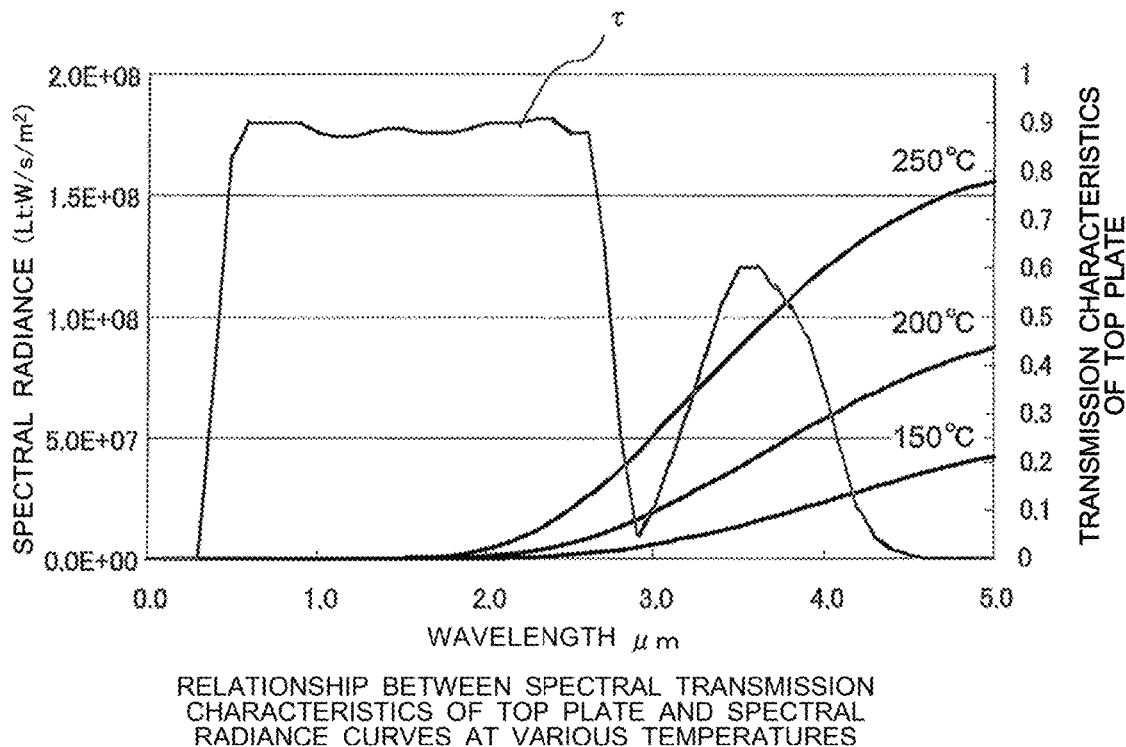
FIG. 6 is a graph showing a relationship between the spectral transmission characteristics of the top plate in the induction cooker according to Embodiment 1 and spectral radiance curves at various temperatures.

Next, spectral transmission characteristics of the top plate 3 will be described. FIG. 5 is a graph showing spectral transmission characteristics of the top plate 3 in the induction cooker 1 according to the present embodiment. The graph of FIG. 5 shows, as an example, a transmittance τ obtained when the top plate 3 is made of highly heat-resistant crystallized glass approximately 4 mm in thickness. Also, FIG. 6 is a graph showing a relationship between the spectral transmission characteristics of the top plate 3 in the induction cooker 1 according to the present embodiment and spectral radiance curves at various temperatures. FIG. 6 shows spectral radiance curves and the transmittance τ of the top plate 3 when the temperatures of the cooking container 100 are 150 degrees C., 200 degrees C., and 250 degrees C.

As can be seen from FIG. 5, on the top plate 3, the wavelength band with the highest transmittance is 0.6 μm to 2.6 μm and the wavelength band with the next highest transmittance is 3.2 μm to 4.2 μm. Also, as can be seen from FIG. 6, the spectral radiance curves at temperatures of the cooking container 100 of 150 degrees C., 200 degrees C., and 250 degrees C. start to increase at around 2.0 μm. Thus, the value of the amount of infrared energy arriving at the infrared sensor 211 from the bottom of the cooking container 100, which is given by the product of the transmittance τ (%) and the spectral radiance, increases in the wavelength band of 3.2 μm to 4.2 μm. Therefore, to detect the temperature of the cooking container 100, it is necessary to detect the infrared radiation in this wavelength band. By detecting the wavelength band of 3.2 μm to 4.2 μm, it is possible to accurately measure the temperature range of the cooking container 100 of 140 degrees C. or above, which is less subject to damping caused by the top plate 3.

The infrared sensor 211 detects the infrared energy emitted from the bottom of the cooking container 100 and the infrared energy emitted from the underside of the top plate 3 when the top plate 3 is heated by heat conduction. The infrared energy emitted from the top plate 3 is emitted at high rates in a region with a low transmittance, i.e., in a wavelength band longer than 4.5 μm. Generally, emissivity ε of glass is as high as about 0.84 to 0.9.

Figure 7:
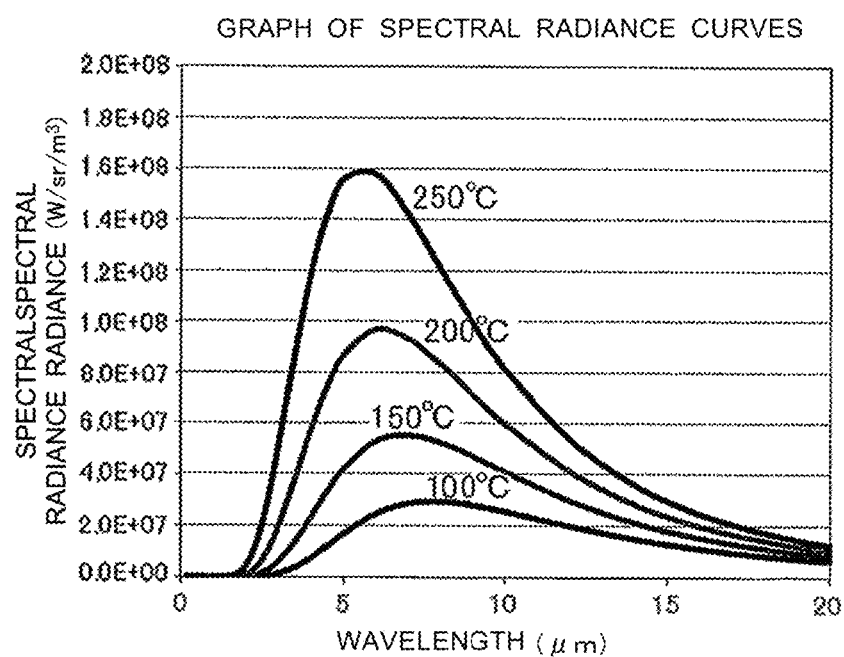
FIG. 7 is a graph showing spectral radiance curves of a black body at various temperatures.

FIG. 7 is a graph showing spectral radiance curves of a black body at various temperatures. Food to be cooked (the cooking container 100) is heated by the induction cooker 1 in a temperature zone generally lower than 230 degrees C. used for cooking ranging from water boiling to deep frying. According to FIG. 7, spectral radiance at temperatures up to 250 degrees C. is detected as a wavelength band of up to around 20 μm. Consequently, the amount of infrared energy emitted from the top plate 3 has a great impact as noise on the wavelength band of 3.2 μm to 4.2 μm originally desired to be detected by the infrared sensor 211.

(Control Over Cooking Container)

Figure 8:
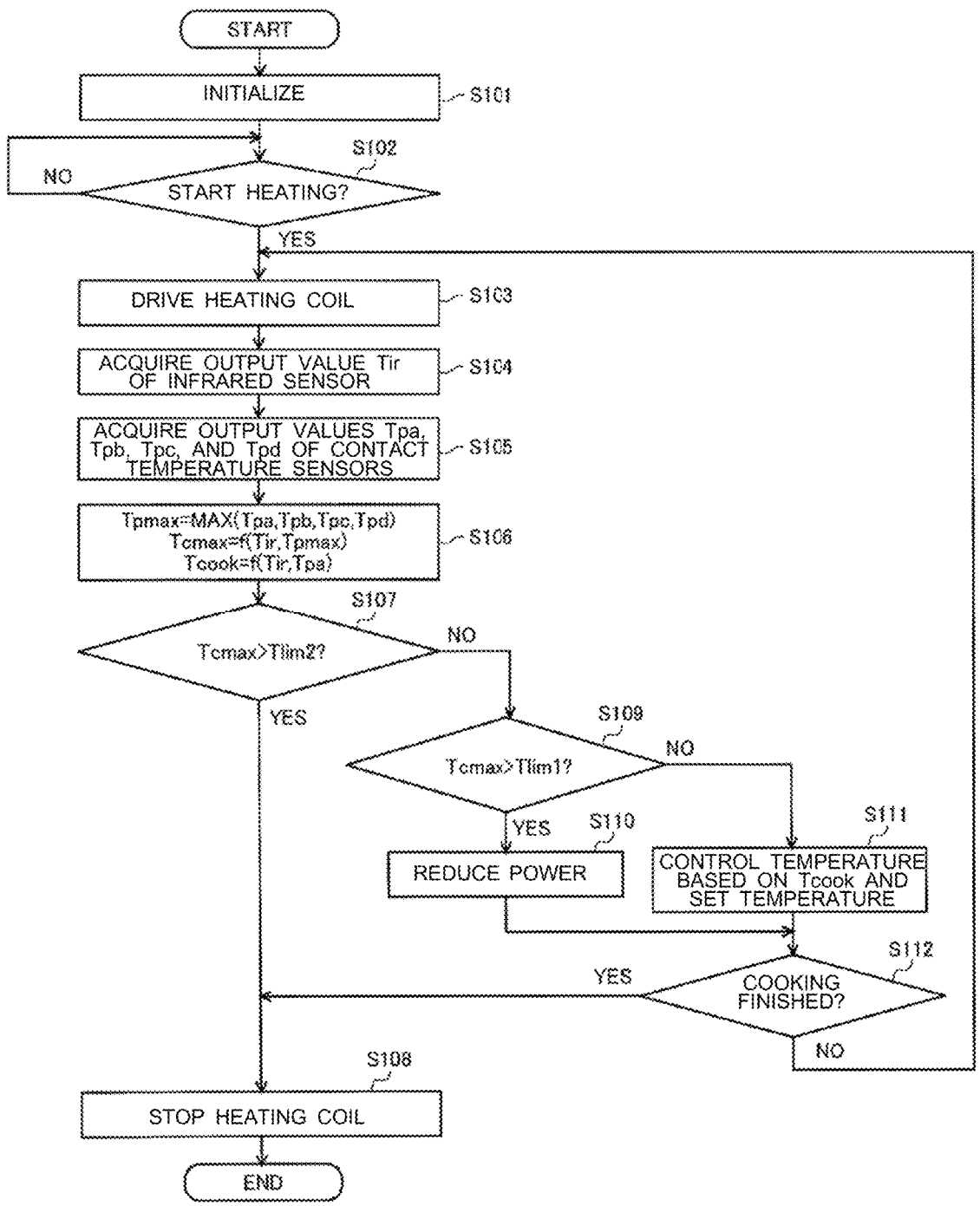
FIG. 8 is a flowchart showing a flow of cooking operations according to Embodiment 1.

Next, heating control performed by the control unit 10 according to the present embodiment will be described. FIG. 8 is a flowchart showing a flow of cooking operations according to the present embodiment.

First, when the user turns on a power switch 22, the control unit 10 starts up, initializes various data (S101), and enters a state of waiting for the user to issue a start heating command (S102). Then, when the user sets a cooking temperature and issues a start heating command using the display unit 34 or another similar unit (YES in S102), the control unit 10 drives the heating coil 4 (S103). Specifically, the inverter 12 is controlled by the control unit 10 to drive the heating coil 4 based on the temperature set by the user and supplies electric power of a predetermined frequency to the heating coil 4.

Consequently, magnetic flux is generated from the heating coil 4, generating an eddy current on the cooking container 100 and thereby heating the cooking container 100. Then, infrared radiation emitted from the cooking container 100 is received by the infrared sensor 211, and an output value Tir corresponding to an amount of received light is outputted to the temperature detection unit 9 (S104).

Also, the amount of heat generated when the cooking container 100 is heated is conducted to the top plate 3, thereby heating the top plate 3. Then, top plate temperatures Tpa, Tpb, Tpc, and Tpd are detected, respectively, by the plural contact temperature sensors 8a, 8b, 8c, and 8d placed below the top plate 3, and outputted to the temperature detection unit 9 (S105).

The temperature detection unit 9 extracts the highest temperature, as Tpmax, from the top plate temperatures Tpa, Tpb, Tpc, and Tpd detected by the contact temperature sensors 8a, 8b, 8c, and 8d. Then, the temperature detection unit 9 corrects the output value Tir of the infrared sensor 211 with Tpmax and thereby calculates the maximum temperature Tcmax of the cooking container 100. Also, the temperature detection unit 9 corrects the output value Tir of the infrared sensor 211 with the top plate temperature Tpa detected by the contact temperature sensor 8a and thereby calculates the cooking control temperature Tcook of the cooking container 100 (S106). The contact temperature sensor 8a is placed above the ferrite core 6a located next to the infrared sensor 211. The output value Tir of the infrared sensor 211 is corrected, for example, by subtracting Tpmax or Tpa from the temperature corresponding to the output value Tir.

Next, the control unit 10 compares the maximum temperature Tcmax of the cooking container 100 calculated by the temperature detection unit 9 with two-stage limit values made up of a first limit value Tlim1 and second limit value Tlim2. The first limit value Tlim1 is smaller than the second limit value Tlim2. The first limit value Tlim1 and second limit value Tlim2 may be set in advance according to a cooking mode or the like or set as desired by the user. Then, when the maximum temperature Tcmax is higher than the second limit value Tlim2 (YES in S107), by determining that the temperature of the cooking container 100 is too high, the control unit 10 stops driving the heating coil 4 (S108).

In so doing, the display unit 34 or non-illustrated notification unit may notify the user visually or orally that heating has been stopped.

On the other hand, when the maximum temperature Tcmax is equal to or lower than the second limit value Tlim2 (NO in S107) and is higher than the first limit value Tlim1 (YES in S109), it is judged that the temperature of the cooking container 100 is approaching a high temperature. Therefore, in this case, power delivered to the heating coil 4 is reduced (S110). In so doing, the display unit 34 or non-illustrated notification unit may notify the user visually or orally that heating has been decelerated.

On the other hand, when the maximum temperature Tcmax is equal to or lower than the first limit value Tlim1 (NO in S109), it is determined that the temperature of the cooking container 100 is appropriate, and cooking temperature control is performed based on the cooking control temperature Tcook calculated by the temperature detection unit 9 and the set temperature (S111).

In cooking temperature control, feedback control is used to maintain a set temperature. Specifically, the control unit 10 compares the set temperature with the cooking control temperature Tcook. Then, when the cooking control temperature Tcook is lower than the set temperature, electric power is supplied to the heating coil 4. Then, when the cooking control temperature Tcook is brought close to the set temperature, the control unit 10 increases the frequency of delivered power and thereby reduces the power delivered to the heating coil 4. When the cooking control temperature Tcook exceeds the set temperature, the control unit 10 stops the inverter 12 and thereby stops power supply to the heating coil 4. By repeating the above operations to the end of cooking, the control unit 10 maintains the cooking control temperature Tcook at the set temperature.

When the cooking is finished (YES in S112), the control unit 10 stops the inverter 12 and thereby cuts off power supply to the heating coil 4 (S108). This type of control makes it possible to reduce the impact of infrared energy emitted from the top plate 3.

(Configuration of Noncontact Temperature Sensor 7)

Figure 9:
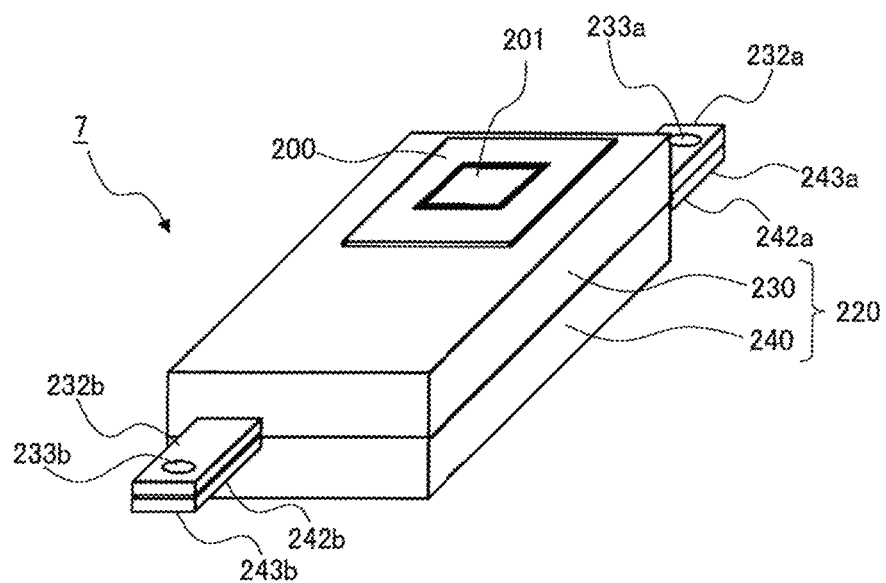
FIG. 9 is a perspective view of a noncontact temperature sensor according to Embodiment 1.
Figure 10:
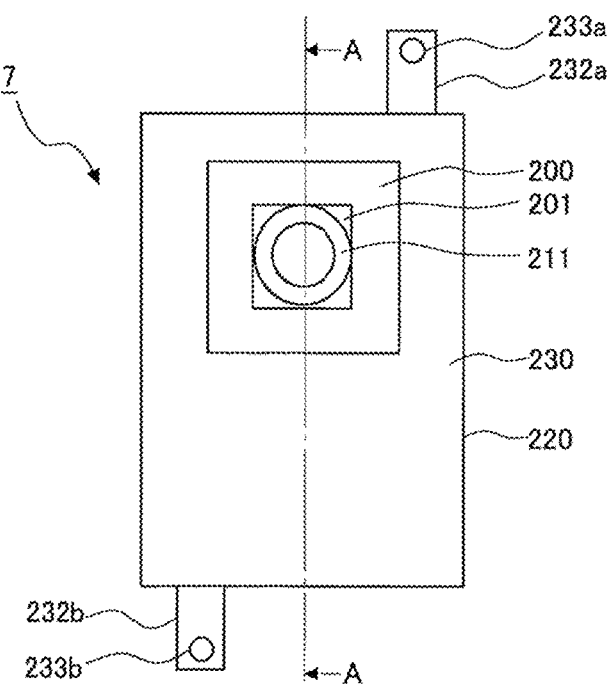
FIG. 10 is a plan view of the noncontact temperature sensor according to Embodiment 1.
Figure 11:
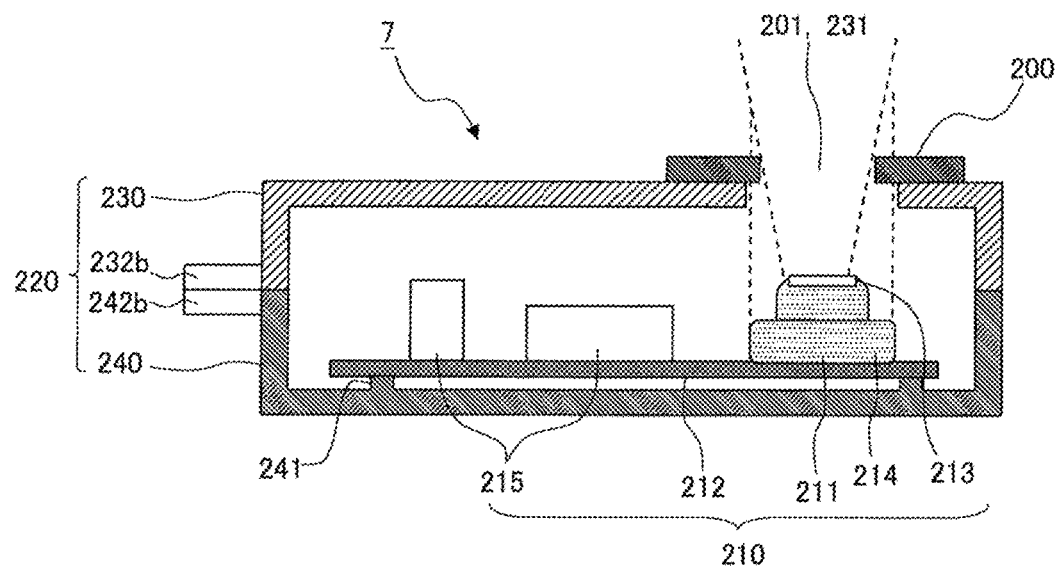
FIG. 11 is a longitudinal sectional view of the noncontact temperature sensor according to Embodiment 1 taken along line A-A of FIG. 10.
Figure 12:
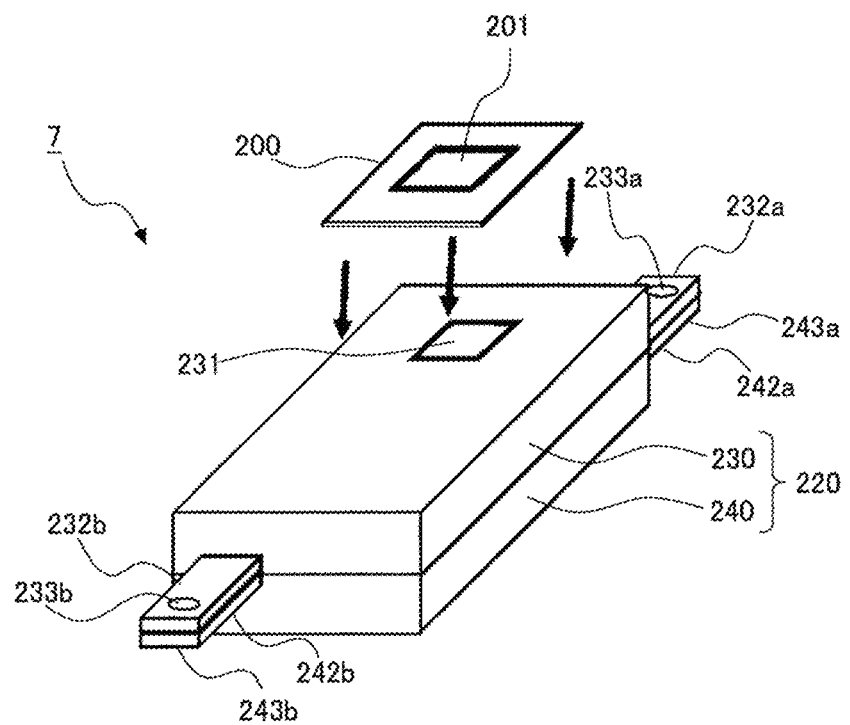
FIG. 12 is a perspective view of the noncontact temperature sensor according to Embodiment 1 as a magnetic path forming member and a sensor casing of the noncontact temperature sensor are separated from each other.

Next, the noncontact temperature sensor 7 of the present embodiment will be described in detail. FIG. 9 is a perspective view of the noncontact temperature sensor 7 according to the present embodiment and FIG. 10 is a plan view of the noncontact temperature sensor 7 according to the present embodiment. Also, FIG. 11 is a longitudinal sectional view of the noncontact temperature sensor 7 according to the present embodiment taken along line A-A of FIG. 10. Furthermore, FIG. 12 is a perspective view of the noncontact temperature sensor 7 according to the present embodiment as the magnetic path forming member 200 and the sensor casing 220 of the noncontact temperature sensor 7 are separated from each other. As shown in FIGS. 9 to 12, the noncontact temperature sensor 7 includes the infrared sensor unit 210 including the infrared sensor 211, the sensor casing 220 configured to house the infrared sensor unit 210, and the magnetic path forming member 200 placed on a top face of the sensor casing 220. The noncontact temperature sensor 7 is attached to the coil base 5 such that that a top face of the noncontact temperature sensor 7 will be in parallel to the heating coil 4.

(Magnetic Path Forming Member 200)

The magnetic path forming member 200 is designed to guide magnetic flux generated from the heating coil 4 and passing above the infrared sensor 211. As shown in FIGS. 10 and 11, the magnetic path forming member 200 is a plate-like member larger in area than the infrared sensor 211 in planar view, and is placed covering the infrared sensor 211. Note that it is sufficient as long as the magnetic path forming member 200 is configured such that the length of a side parallel to the orientation of magnetic flux generated on the infrared sensor 211 is longer than the length parallel to the orientation of magnetic flux of the infrared sensor 211. Also, the magnetic path forming member 200 has an opening 201 that allows the infrared radiation from the cooking container 100 to pass. The magnetic path forming member 200 is placed in an uppermost part of the noncontact temperature sensor 7, and fixed in close contact to the top face of the sensor casing 220 by adhesives, tapes, sticky cushioning materials, or other materials. Consequently, the magnetic path forming member 200 is placed in parallel to the heating coil 4.

The magnetic path forming member 200 of the present embodiment is made of a material whose relative permeability $\mu_s$ in a driving frequency band of the induction cooker 1 is higher than relative permeability ($\mu_s=1$) of air. As an example, the magnetic path forming member 200 is made of soft ferrite, which is a soft magnetic substance. Ferrite is a magnetic oxide composed principally of iron, and is expressed by a chemical formula of $MO\text{-}Fe_2O_3$, where M represents a divalent ion of metal such as Fe, Mn, Zn, Ni, Mg, Co, or Cu. By changing the metal ion M, ferrites of various properties are available.

Ferrites are roughly classified into hard ferrites, which are magnetically hard, and soft ferrites, which are magnetically soft. The hard ferrites do not change much in magnetic flux density at first even if a magnetic field is intensified, but magnetize by allowing magnetic flux to flow suddenly when the magnetic field is intensified greatly. Also, the hard ferrites have the property of being resistant to returning to their original state if magnetized once even if a magnetic flux of opposite polarity is applied. On the other hand, the soft ferrites are readily magnetized by allowing magnetic flux to flow as soon as a magnetic field is increased, but have the property of readily returning to their original state if a magnetic flux of opposite polarity is applied.

The soft ferrites include Mn—Zn ferrites and Ni—Zn ferrites. The Mn—Zn ferrites have high magnetic permeability $\mu$ and high magnetic flux density B, but accordingly, available frequencies are 1 MHz or below because of a Snoek's effect. Also, the soft ferrites need insulation processing because of electrical conductivity, and increase in shape when used as a filter. Almost all Ni—Zn ferrites are insulators and perform excellently at high frequencies. Therefore, Ni—Zn ferrites are often used for noise control measures used in electronic circuits, such as filters.

The magnetic path forming member 200 according to the present embodiment guides magnetic flux flowing in space into the magnetic path forming member 200 by making use of the high magnetic permeability of ferrite. It is not that any magnetic substance may be used as the magnetic path forming member 200, and it is necessary to use a magnetic substance having relative permeability $\mu_s$ higher than air at the driving frequency (20 KHz to 100 KHz) of the induction cooker 1. Note that a hard magnetic substance such as hard ferrite may be used as long as the magnetic substance has high relative permeability $\mu_s$ in the driving frequency band of the induction cooker 1.

Here, the relative permeability $\mu_s$ is a ratio between magnetic permeability of a given magnetic substance and magnetic permeability of a vacuum, and is an index showing the degree of easiness in allowing the magnetic flux to pass as compared with the vacuum. Note that because vacuum and air are substantially equal in magnetic permeability, it can be said that the relative permeability $\mu_s$ represents the degree of easiness in passing magnetic flux therethrough as compared with air. A relationship among the relative permeability $\mu_s$, magnetic field density H, and magnetic flux density B is given by:

$$B=\mu_{ab}H=\mu_0\mu_s H$$

$\mu_{ab}$=absolute magnetic permeability [H/m]
$\mu_0$=magnetic permeability of vacuum ($4\pi \times 10^{-7}$ [H/m])
$\mu_s$=relative permeability (the degree of easiness for the magnetic substance in allowing magnetic flux to pass as compared with vacuum)

When a magnetic substance is used for a magnetic path forming member for a shielding purpose as with the present embodiment, relative permeability is important. When magnetic substances are equal in size, the higher the relative permeability, the higher a magnetic flux guiding effect. In other words, by using a magnetic substance with high relative permeability for the magnetic path forming member 200, it is possible to decrease the size of the magnetic path forming member 200, and reduce materials.

Also, the magnetic permeability $\mu$ of ferrite is not constant and varies with the frequency, magnitude of the magnetic field, or temperature. Normally, the magnetic permeability of ferrite increases with ferrite temperature, but reaches a local maximum at a certain temperature. When the temperature increases further, the magnetic permeability of ferrite becomes equal to the magnetic permeability $\mu=1$ of air. The temperature at which the magnetic substance loses its magnetism (becomes equal in magnetic permeability to air) is known as a Curie temperature, and varies with the type of ferrite. According to the present embodiment, it is preferred that the Curie temperature of the ferrite used for the magnetic path forming member 200 be equal to or higher than a coating heat-resistant temperature of the heating coil 4. For example, if a coating of the heating coil 4 is a class H coating, the coating heat-resistant temperature is 180 degrees C. and ferrite whose Curie temperature is 180 degrees C. or above is used for the magnetic path forming member 200.

Also, the material of the magnetic path forming member 200 is not limited to a soft ferrite, and any material may be used as long as the relative permeability $\mu_s$ of the material in the driving frequency band of the induction cooker 1 is higher than the relative permeability ($\mu_s=1$) of air.

(Infrared Sensor Unit 210)

As shown in FIG. 11, the infrared sensor unit 210 includes the infrared sensor 211 and a substrate 212 on which the infrared sensor 211 is mounted. The infrared sensor unit 210 detects infrared radiation emitted from an object to be heated and outputs a voltage. As the infrared sensor 211, for example, a thermopile sensor, which has sensitivity to a wide wavelength range in an infrared region, is used. As shown in FIG. 11, the infrared sensor 211 of the present embodiment includes a condensing lens 213 and an enclosing member 214 packaged on the substrate 212, where the condensing lens 213 has a convex shape and the enclosing member 214 is cylinder-shaped and placed under the condensing lens 213. A non-illustrated thermopile and self-temperature detection thermistor are enclosed inside the enclosing member 214.

By forming the condensing lens 213 of the infrared sensor 211 into a convex shape as in the present embodiment, it is possible to narrow a field of view area of the infrared sensor 211 and lessen the effect of ambient light. Also, silicon is used as a base material for the condensing lens 213. Silicon has low wavelength dependence with a transmittance of approximately 50 to 60% in the infrared region and has high reflectivity except for optical transmission in the infrared region while having low heat absorptivity, and is thus hardly affected by temperature increases. Also, because silicon has high thermal diffusion, even if the condensing lens 213 absorbs infrared radiation, resulting in a temperature rise, thermal diffusion makes detection of an amount of infrared radiation less susceptible to the temperature rise. Therefore, even in an operating environment in which the infrared sensor 211 is provided near the top plate 3, the use of silicon as a base material for the condensing lens 213 makes temperature increases of the condensing lens 213 hardly affected by detection of infrared radiation. Note that the base material for the condensing lens 213 is not limited to silicon, and any material having similar transparency characteristics and thermal diffusion may be used.

Also, specific configurations of the infrared sensor 211 are not limited to the one illustrated in FIG. 11. For example, a photodiode-based infrared sensor may be used as the infrared sensor 211. Also, the shape of the enclosing member 214 may not necessarily be cylindrical.

The infrared sensor 211, an amplifier, and various electronic components 215 configured to control the amplifier are mounted on the substrate 212. The infrared sensor 211 is placed on the substrate 212 such that a light-receiving unit will be located right under the opening 201 of the magnetic path forming member 200. The voltage outputted from the infrared sensor 211 is amplified by the amplifier and transmitted to the temperature detection unit 9. Then, temperature information on the object to be heated is obtained by the temperature detection unit 9, outputted to the control unit 10, and used for heating control and other purposes.

(Sensor Casing 220)

The sensor casing 220 is a casing configured to cover peripheries of the infrared sensor unit 210 such that the infrared sensor unit 210 will not be exposed directly to cooling air flowing in a neighborhood of the heating coil 4. The sensor casing 220 of the present embodiment has a cuboid shape, being rectangular in planar view. The sensor casing 220 is made, for example, of a resin such as a polybutylene terephthalate resin (PBT) with high heat resistance performance or a polyphenylene sulfide resin (PPS).

As shown in FIGS. 11 and 12, the sensor casing 220 includes an upper casing 230 and a lower casing 240. As the infrared sensor unit 210 is placed inside the lower casing 240 and the upper casing 230 is put thereon, the infrared sensor unit 210 is housed in the sensor casing 220. In so doing, the infrared sensor unit 210 is housed within the sensor casing 220 while keeping a predetermined distance from a side wall of the sensor casing 220 such that ambient temperature around the infrared sensor 211 will be uniform.

The upper casing 230 has the top face that is rectangular in shape in planar view and side faces extending from four sides of the top face and has an open bottom. Also, as shown in FIGS. 11 and 12, an opening 231 is formed in the top face of the upper casing 230 to allow the infrared sensor 211 to receive infrared radiation. With the infrared sensor unit 210 housed in the sensor casing 220, the infrared sensor 211 detects infrared radiation through the opening 231 in the upper casing 230 and the opening 201 in the magnetic path forming member 200. Note that the opening 231 in the upper casing 230 and the opening 201 in the magnetic path forming member 200 are not limited to a rectangular shape, and may be a circular or polygonal shape.

The lower casing 240 has a bottom face that is rectangular in shape in planar view and side faces extending upward from four sides of the bottom face and has an open top. As shown in FIG. 11, support members 241 protruding upward from the bottom face of the lower casing 240 and used to place the substrate 212 of the infrared sensor unit 210 are formed on inner sides of the bottom face of the lower casing 240. According to the present embodiment, four support members 241 are provided along four sides of the bottom face of the substrate 212.

By supporting the substrate 212 on the support members 241, a clearance is provided between the substrate 212 and the bottom face of the lower casing 240. This ensures coolability of the substrate 212. Note that, although the lower casing 240 according to the present embodiment has four support members 241, this is not restrictive. It is sufficient that the support members 241 can support the substrate 212, keeping the substrate 212 motionless, and, for example, the support members 241 may be placed at four corners on the bottom face of the substrate 212 or three or less or five or more support members 241 may be placed in a scattered manner.

Engaging protrusions (not shown) are provided at those positions in lower end portions on side faces of the upper casing 230 and those positions in an outer peripheral portion of the lower casing 240 that are brought into a face-to-face relationship with each other when the upper casing 230 is put on the lower casing 240. When the upper casing 230 is put on the lower casing 240, the engaging protrusions get engaged with each other, thereby allowing the upper casing 230 and lower casing 240 to be positioned.

Also, on side faces on the shorter sides of the upper casing 230, mounting strips 232a and 232b, protruding outward, are respectively formed. Also, insertion holes 233a and 233b are respectively formed in the mounting strips 232a and 232b. Similarly, on side faces on the shorter sides of the lower casing 240, mounting strips 242a and 242b, protruding outward, are respectively formed. Also, insertion holes 243a and 243b are respectively formed in the mounting strips 242a and 242b.

The mounting strip 232a and the mounting strip 242a are placed overlapping one on another, and so do the mounting strip 232b and the mounting strip 242b, in planar view when the upper casing 230 and the lower casing 240 are engaged with each other. Then, screws are passed through the insertion hole 233a and the insertion hole 243a as well as through the insertion hole 233b and the insertion hole 243b and fixed to a backside (side opposite the heating coil 4) of the coil base 5, thereby attaching the sensor casing 220 to the coil base 5. In so doing, the sensor casing 220 is fixed to the coil base 5 in a state where a certain distance between the top plate 3 and infrared sensor 211 is kept.

Next, a magnetic shielding effect for the noncontact temperature sensor 7 will be described.

Figure 13:
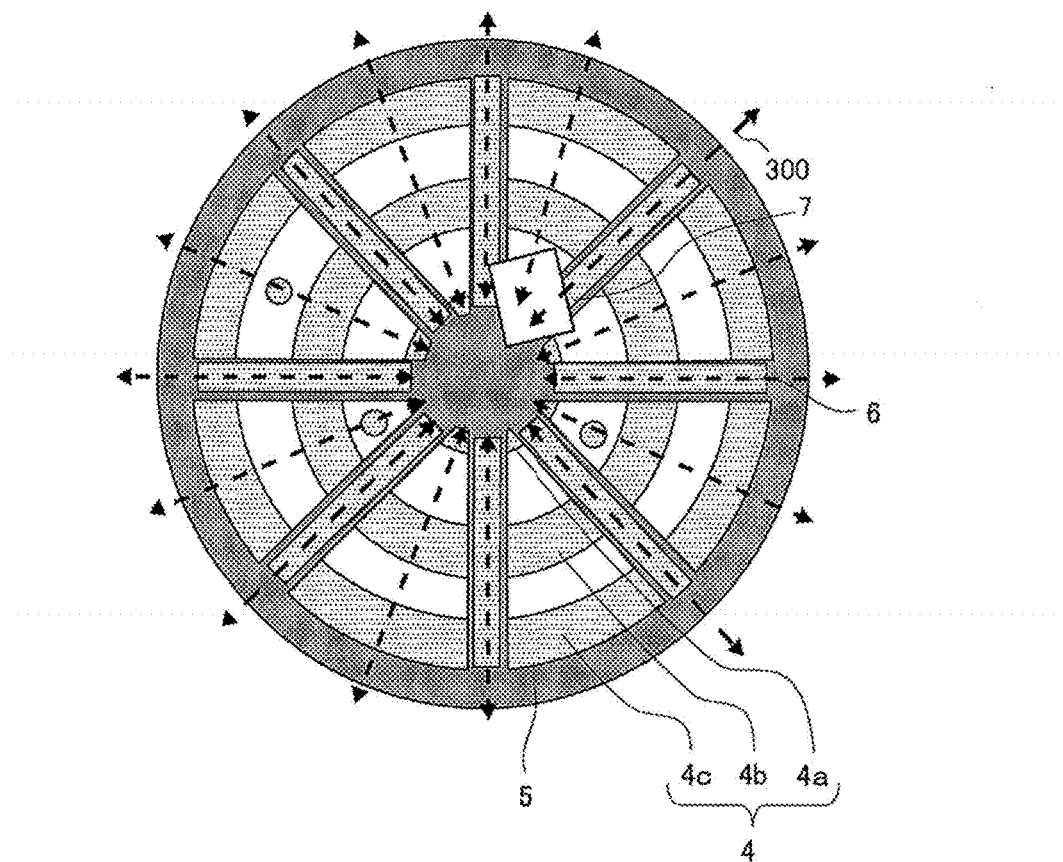
FIG. 13 is a schematic diagram showing magnetic flux of a heating coil and the noncontact temperature sensor according to Embodiment 1.
Figure 14:
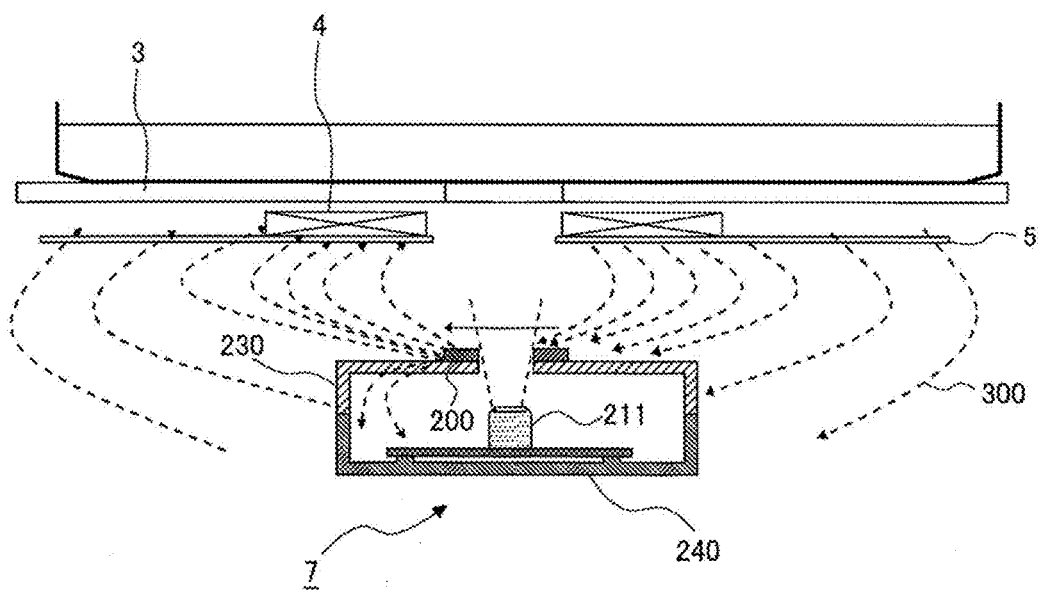
FIG. 14 is a schematic diagram showing the magnetic flux of the heating coil and a noncontact temperature sensor according to Embodiment 1.

A noise source of the induction cooker 1 is the heating coil 4 placed above the noncontact temperature sensor 7. FIGS. 13 and 14 are schematic diagrams showing the magnetic flux of the heating coil 4 and the noncontact temperature sensor 7 according to the present embodiment. As shown in FIGS. 13 and 14, around the heating coil 4, a magnetic flux 300 is generated in a direction orthogonal to a current flowing through the heating coil 4. Also, magnetic flux is reduced and weakened as the distance from the heating coil 4 increases. As shown in FIG. 14, a top face of the noncontact temperature sensor 7 is the closest to the heating coil 4 and is affected most greatly by the magnetic flux. Therefore, by placing the magnetic path forming member 200 on the top face of the noncontact temperature sensor 7 as with the present embodiment, the highest magnetic shielding effect for the infrared sensor 211 can be provided.

Figure 15:
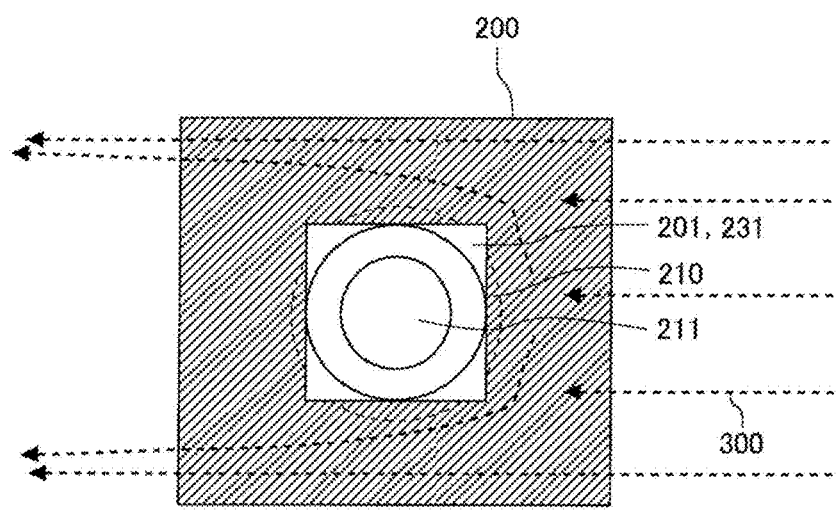
FIG. 15 is a diagram explaining how magnetic flux is guided by the magnetic path forming member according to Embodiment 1.

FIG. 15 is a diagram explaining how magnetic flux is guided by the magnetic path forming member 200 according to the present embodiment. As shown in FIG. 15, the magnetic path forming member 200 according to the present embodiment is placed so as to surround the opening 231 in the upper casing 230. The infrared sensor 211 is placed below the opening 231 in the upper casing 230. Also, the magnetic path forming member 200 is placed in parallel to the magnetic flux generated from the heating coil 4 and passing above the infrared sensor 211. Consequently, leakage flux coming from the heating coil 4 and entering the infrared sensor 211 is guided preferentially by the magnetic path forming member 200. As a result, the magnetic flux passing above the infrared sensor 211 passes through the magnetic path forming member 200 by avoiding a route over the infrared sensor 211 as shown in FIG. 15. This makes it possible to reduce penetration of the magnetic flux into the infrared sensor 211.

As described above, according to the present embodiment, leakage flux from the heating coil 4 can be guided to pass above the infrared sensor 211 by the magnetic path forming member 200 placed on the top face of the sensor casing 220. This makes it possible to inhibit the magnetic flux from entering the infrared sensor 211 and thereby reduce superposition of high frequency noise on the infrared sensor 211. This in turn makes it possible to improve temperature detection accuracy of the infrared sensor 211 and improve the accuracy of precise-temperature cooking and automatic cooking.

Also, by forming the magnetic path forming member 200 into a plate shape, it is possible to improve moldability and reduce manufacturing costs. Also, as the magnetic path forming member 200 of the plate shape is placed partially on the top face of the upper casing 230, it is possible to obtain a magnetic shielding effect, reduce man-hours and material costs, and prevent cost increases of the product using a simple structure. Furthermore, even if the magnetic path forming member 200 is broken, it is possible to prevent broken members from falling or scattering inside the equipment.

Note that the present embodiment is not limited to the above configuration, and various variations are possible. For example, the shape of the magnetic path forming member 200 is not limited to the one described above, and may be changed as desired according to the direction and density of the magnetic flux. Variation 1-1 and Variation 1-2 of the present embodiment will be described below further.

Variation 1-1

Figure 16:
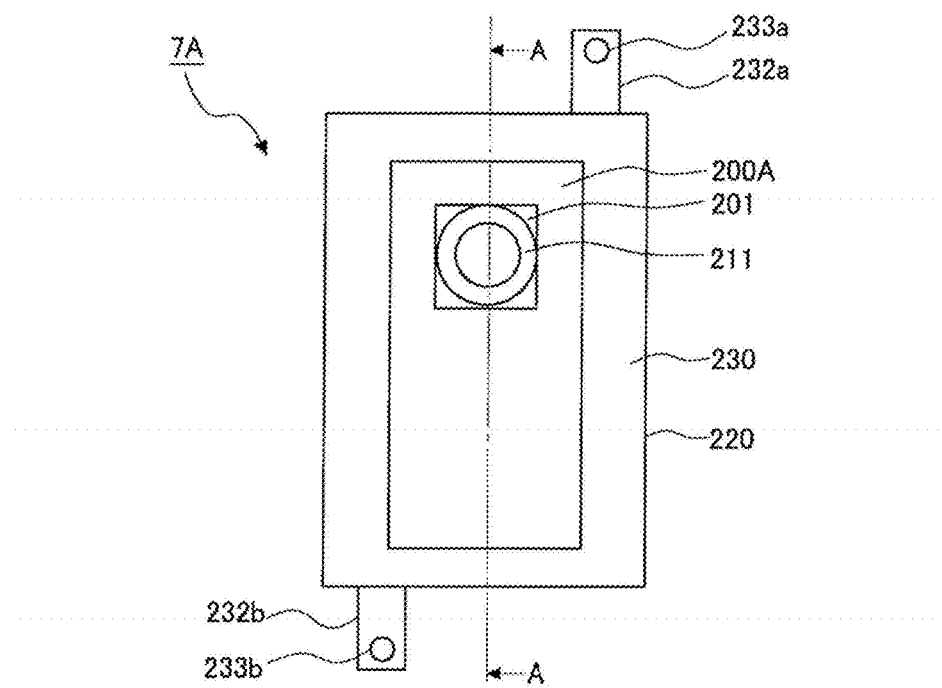
FIG. 16 is a plan view of a noncontact sensor according to Variation 1-1.
Figure 17:
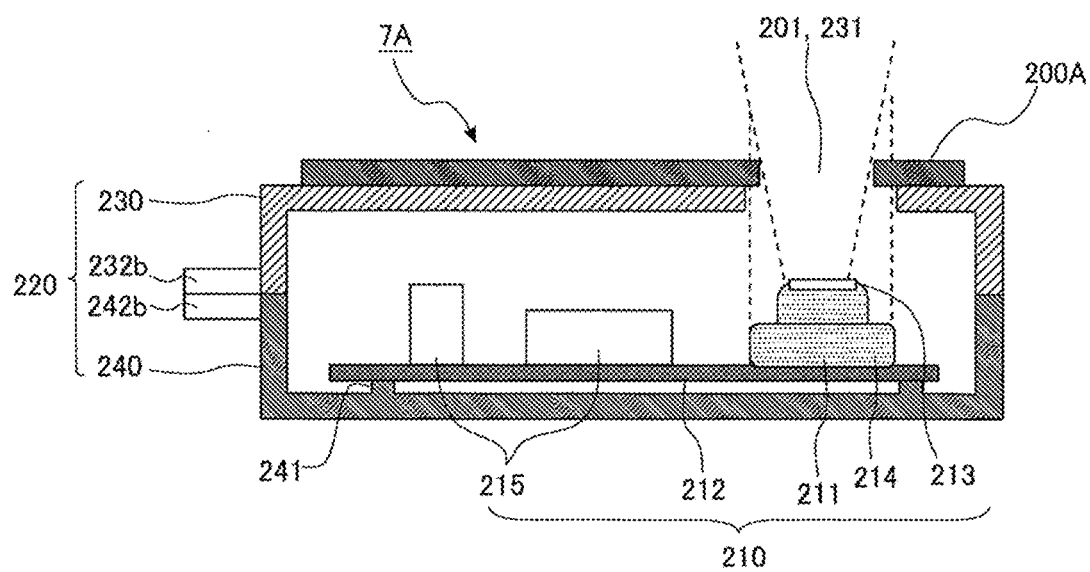
FIG. 17 is a longitudinal sectional view of the noncontact sensor according to Variation 1-1 taken along line A-A of FIG. 16.

FIG. 16 is a plan view of a noncontact temperature sensor 7A according to Variation 1-1 and FIG. 17 is a longitudinal sectional view of the noncontact temperature sensor 7A according to Variation 1-1 taken along line A-A of FIG. 16. Note that in FIGS. 16 and 17, the same components as those in FIGS. 10 and 11 are denoted by the same reference numerals as the corresponding components in FIGS. 10 and 11.

As shown in FIGS. 16 and 17, a magnetic path forming member 200A of the noncontact temperature sensor 7A according to the present variation is larger in area than the substrate 212 of the infrared sensor unit 210 in planar view and is placed covering the substrate 212. Note that it is sufficient if the magnetic path forming member 200A is configured such that the length of a side parallel to the orientation of magnetic flux passing above the substrate 212 is longer than the length parallel to the orientation of magnetic flux of the substrate 212. Also, an opening 201 is provided in the magnetic path forming member 200A to allow the infrared sensor 211 to receive infrared radiation. Also, the magnetic path forming member 200A is made of the same material as the magnetic path forming member 200 of Embodiment 1.

The configuration of the present variation can reduce penetration of magnetic flux not only into the infrared sensor 211, but also into the substrate 212. This makes it possible to reduce high frequency noise in various electronic components 215 and wiring placed on the substrate 212 and further improve temperature detection accuracy.

Variation 1-2

Figure 18:
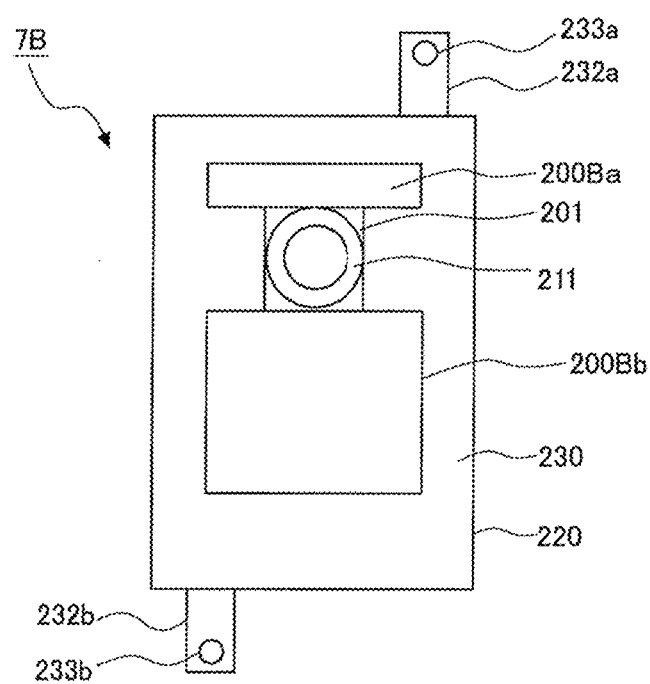
FIG. 18 is a plan view of a noncontact sensor according to Variation 1-2.
Figure 19:
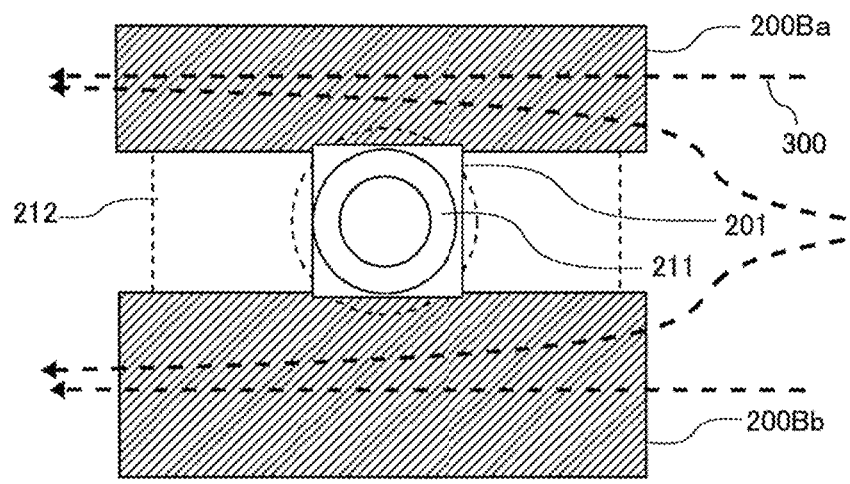
FIG. 19 is a diagram explaining how magnetic flux is guided by a magnetic path forming member according to Variation 1-2.

FIG. 18 is a plan view of a noncontact temperature sensor 7B according to Variation 1-2 and FIG. 19 is a diagram explaining how magnetic flux is guided by a magnetic path forming member according to Variation 1-2. Note that, in FIGS. 18 and 19, the same components as those in FIG. 10 are denoted by the same reference numerals as the corresponding components in FIG. 10.

As shown in FIGS. 18 and 19, the noncontact temperature sensor 7B according to the present variation includes a first magnetic path forming member 200Ba and second magnetic path forming member 200Bb facing each other across the opening 231 on the top face of the upper casing 230. Each of the first magnetic path forming member 200Ba and the second magnetic path forming member 200Bb has a rectangular plate shape and is placed in parallel to the magnetic flux generated on the noncontact temperature sensor 7B. Also, the first magnetic path forming member 200Ba and the second magnetic path forming member 200Bb are made of the same material as that of the magnetic path forming member 200 of Embodiment 1.

As shown in FIG. 19, the first magnetic path forming member 200Ba and the second magnetic path forming member 200Bb according to the present variation guide magnetic flux about to enter the opening 231 in the upper casing 230 before the opening 231. This makes it possible to avoid concentration of magnetic flux near a corner of the opening 231 and guide the magnetic flux smoothly.

In the induction cooker 1, the direction in which an electric current flows through the heating coil 4, which is a noise source, is fixed. Therefore, the direction of the magnetic flux generated from the heating coil 4 is fixed as well and a spot where the magnetic flux is strong can be estimated. Thus, at the spot where the magnetic flux is strong, if the first magnetic path forming member 200Ba and second magnetic path forming member 200Bb are placed along a direction in which the magnetic flux will flow readily, the magnetic flux can be guided effectively and smoothly.

As described above, according to the present variation, the magnetic path forming members can be placed effectively and the magnetic path forming members can be downsized without deteriorating a noise reduction effect. This makes it possible to reduce product cost.

Embodiment 2

Next, Embodiment 2 of the present invention will be described. A noncontact temperature sensor 7C of Embodiment 2 differs from Embodiment 1 in the shape of a sensor casing 220C. Other components and control of the induction cooker 1 are similar to those of Embodiment 1.

Figure 20:
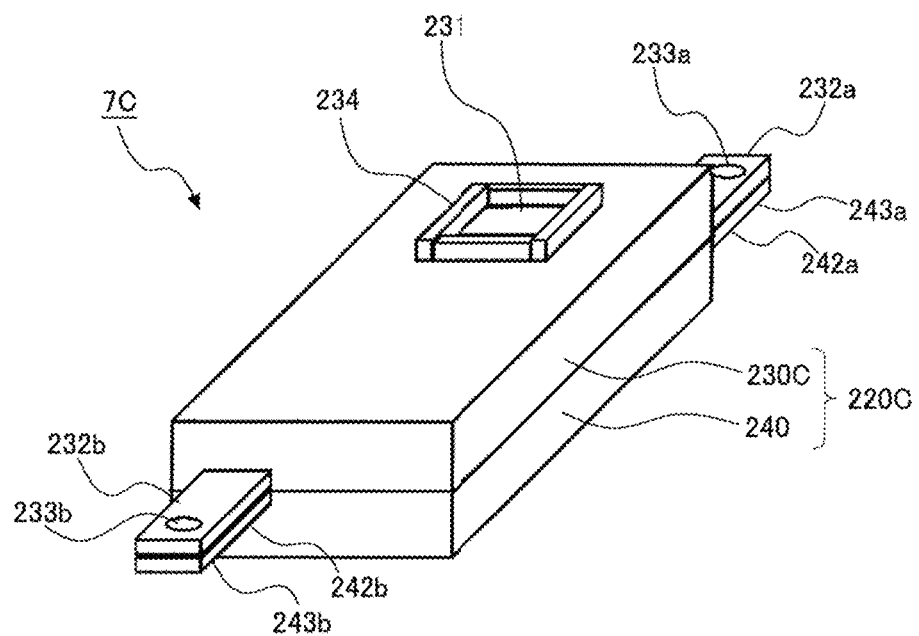
FIG. 20 is a perspective view of a sensor casing according to Embodiment 2.
Figure 21:
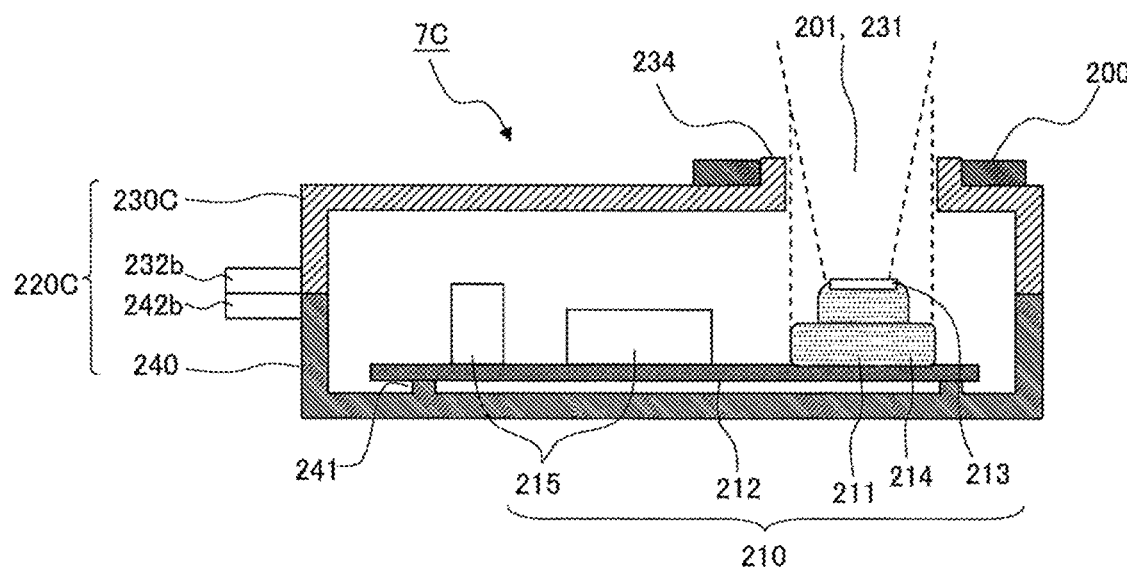
FIG. 21 is a longitudinal sectional view of a noncontact temperature sensor according to Embodiment 2.

FIG. 20 is a perspective view of a sensor casing 220C according to the present embodiment and FIG. 21 is a longitudinal sectional view of a noncontact temperature sensor 7C according to the present embodiment. Also, in FIGS. 20 and 21, the same components as those in FIGS. 9 and 11 are denoted by the same reference numerals as the corresponding components in FIGS. 9 and 11.

As shown in FIG. 20, ribs 234 protruding toward the heating coil 4 (i.e., upward) are formed on a top face of an upper casing 230C of the sensor casing 220C according to the present embodiment. The ribs 234 are formed around an entire outer periphery of the opening 231. Then, as shown in FIG. 21, the magnetic path forming member 200 according to the present embodiment is placed in a state it is fitted around the ribs 234 on the upper casing 230C.

As described above, according to the present embodiment, the position of the magnetic path forming member 200 is governed by the ribs 234 on the upper casing 230C. This makes it easy to position the magnetic path forming member 200 and reduces loads during manufacturing of the noncontact temperature sensor 7C.

Note that the present embodiment is not limited to the above configuration, and various variations are possible. For example, locations of the ribs 234 are not limited to the entire outer periphery of the opening 231 in the upper casing 230C, and the ribs 234 may be provided on only two sides opposite to each other across the opening 231. Furthermore, if the opening 231 is circular, the ribs 234 may be provided at three locations at the same angle from the center of the opening 231. Note that the shape and number of ribs used to position the magnetic path forming member 200 are not limited to those described above, and may be selected as desired. Variation 2-1 of the present embodiment will be described below further.

Variation 2-1

Figure 22:
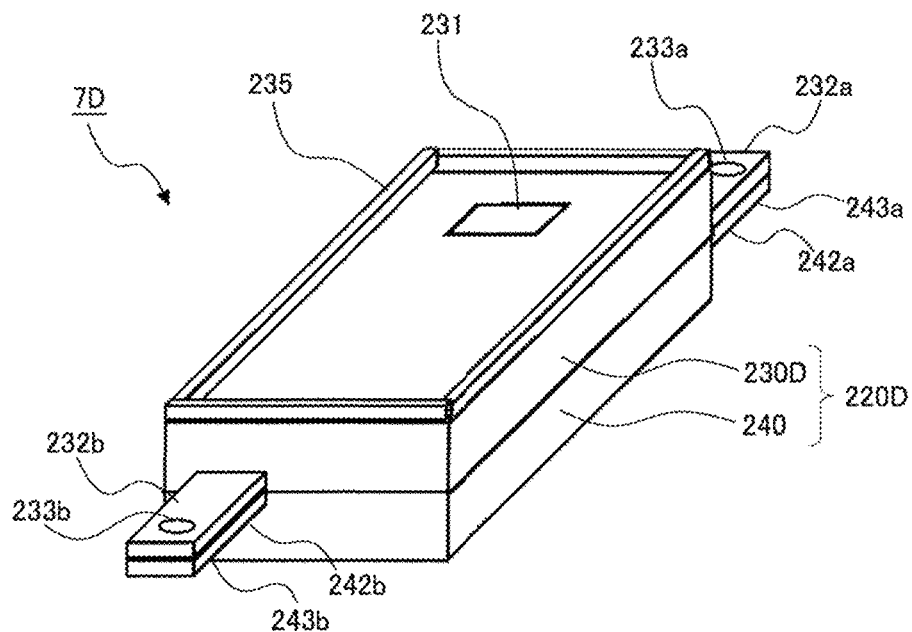
FIG. 22 is a perspective view of a sensor casing according to Variation 2-1.
Figure 23:
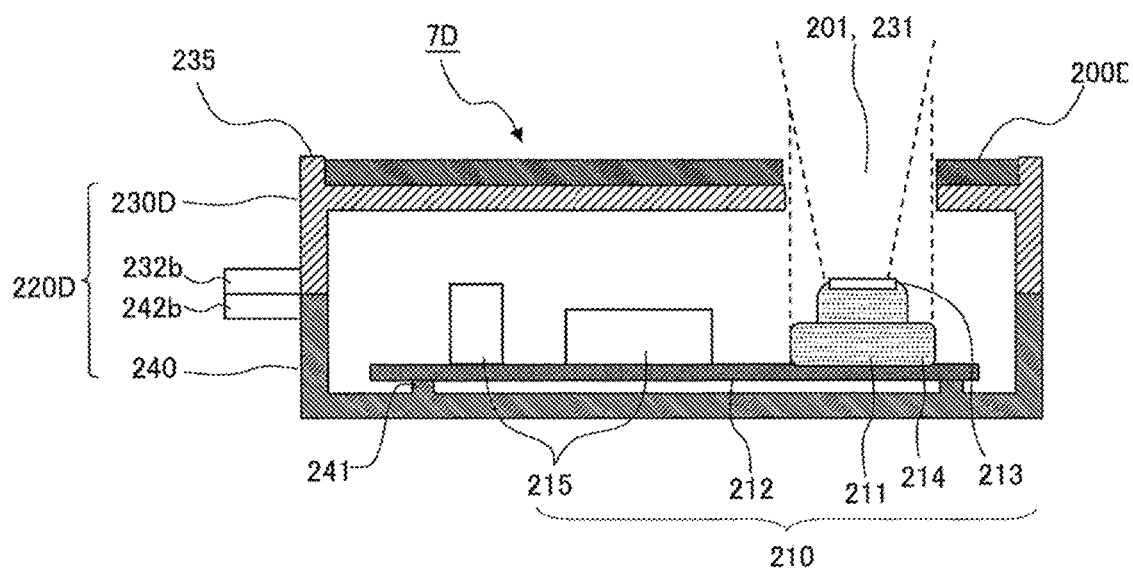
FIG. 23 is a longitudinal sectional view of a noncontact temperature sensor according to Variation 2-1.

FIG. 22 is a perspective view of a sensor casing according 220D to Variation 2-1 and FIG. 23 is a longitudinal sectional view of a noncontact temperature sensor 7D according to Variation 2-1. Also, in FIGS. 22 and 23, the same components as those in FIGS. 9 and 11 are denoted by the same reference numerals as the corresponding components in FIGS. 9 and 11.

As shown in FIG. 22, ribs 235 protruding toward the heating coil 4 (i.e., upward) along an outer periphery are formed on a top face of an upper casing 230D of the sensor casing 220C according to the present embodiment. Besides, as shown in FIG. 23, a magnetic path forming member 200D is placed in a state where it is fitted in the ribs 235 on the upper casing 230D.

As described above, also in the present variation, the position of the magnetic path forming member 200D is governed by the ribs 235 on the upper casing 230D. This makes it easy to position the magnetic path forming member 200D and reduces loads during manufacturing of the noncontact temperature sensor 7D. Note that, in the present variation, again, locations of the ribs 235 are not limited to the entire outer periphery of the upper casing 230D, and may be provided in corners, plural locations on each side, or other locations selected as desired.

Embodiment 3

Next, Embodiment 3 of the present invention will be described. A noncontact temperature sensor 7E of Embodiment 3 differs from Embodiment 1 in the shape of a magnetic path forming member. Other components and control of the induction cooker 1 are similar to those of Embodiment 1.

Figure 24:
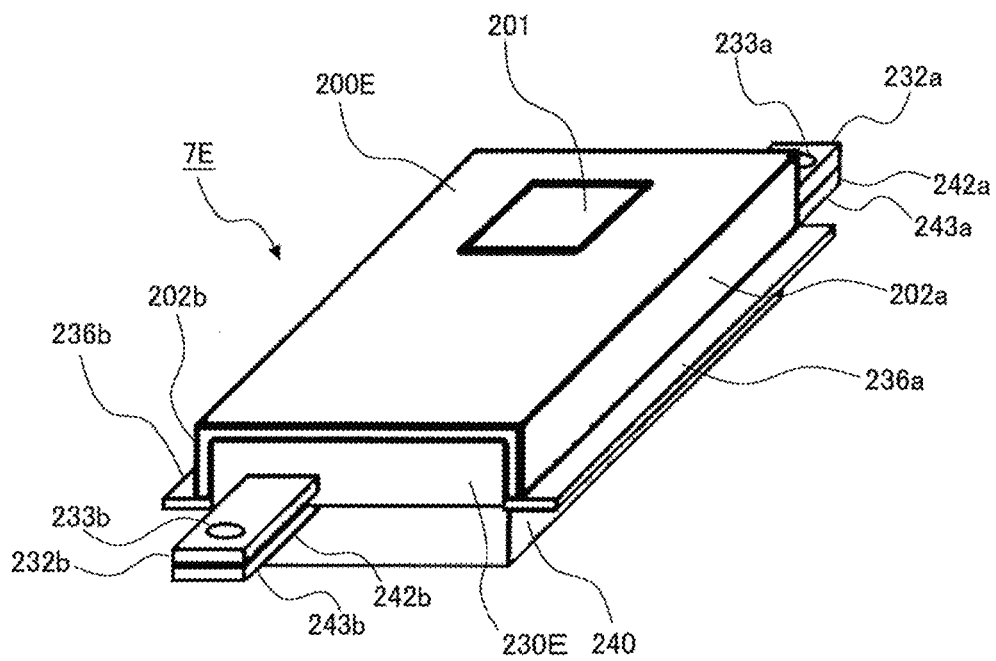
FIG. 24 is a perspective view of a noncontact temperature sensor according to Embodiment 3.
Figure 25:
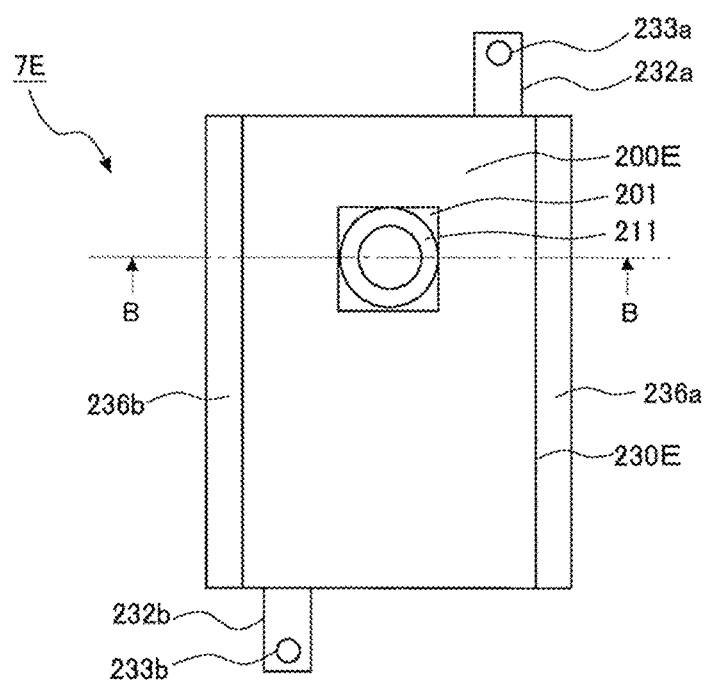
FIG. 25 is a plan view of the noncontact temperature sensor according to Embodiment 3.
Figure 26:
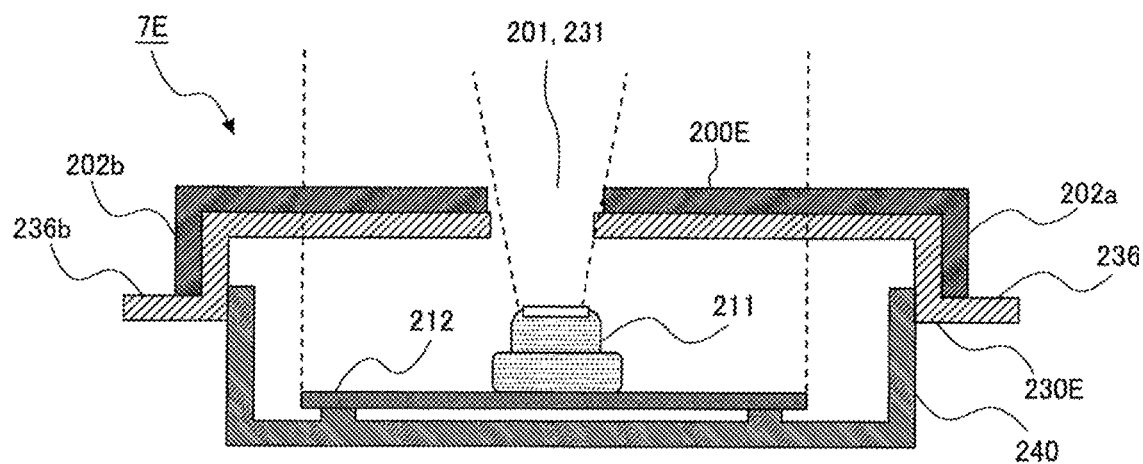
FIG. 26 is a cross-sectional view of the noncontact temperature sensor according to Embodiment 3 taken along line B-B of FIG. 25.

FIG. 24 is a perspective view of a noncontact temperature sensor 7E according to the present embodiment and FIG. 25 is a plan view of the noncontact temperature sensor 7E according to the present embodiment. Also, FIG. 26 is a cross-sectional view of the noncontact temperature sensor 7E according to the present embodiment taken along line B-B of FIG. 25. In FIGS. 24 to 26, the same components as those in FIGS. 9 to 11 are denoted by the same reference numerals as the corresponding components in FIGS. 9 to 11.

As shown in FIGS. 24 to 26, a magnetic path forming member 200E of the present embodiment includes a lateral portion 202a and a lateral portion 202b extending downward by bending from long sides. The lateral portions 202a and 202b extend downward from a top face of an upper casing 230E along side faces on the long sides of the upper casing 230E. The magnetic path forming member 200E is made of the same material as that of the magnetic path forming member 200 of Embodiment 1.

Also, on the side faces on the long sides of the upper casing 230E, a wing 236a and a wing 236b, protruding outward, are respectively formed. The lateral portions 202a and 202b of the magnetic path forming member 200E are placed on the wing 236a and the wing 236b of the magnetic path forming member 200E, respectively.

As described above, according to the present embodiment, the lateral portions 202a and 202b of the magnetic path forming member 200E can guide magnetic flux that is directed at the side faces and could not be guided to the top face of the upper casing 230E and further reduce superposition of noise on the infrared sensor 211. Also, the position of the magnetic path forming member 200E relative to the upper casing 230E is governed by the lateral portions 202a and 202b of the magnetic path forming member 200E. This makes it easy to position the magnetic path forming member 200E and reduces loads during manufacturing of the noncontact temperature sensor 7E.

Furthermore, since the wing 236a and the wing 236b configured to receive the lateral portions 202a and 202b of the magnetic path forming member 200E, respectively, are provided on the upper casing 230E, any broken part can be kept from falling even if the magnetic path forming member 200E is broken. Note that the wings 236a and 236b are not essential components, and may be omitted.

Note that the present embodiment is not limited to the above configuration, and various variations are possible. For example, whereas in the above configuration, the lateral portions 202a and 202b are provided by bending the magnetic path forming member 200E on the long sides, the lateral portions 202a and 202b may be provided by bending the magnetic path forming member 200E on the short sides. Alternatively, four lateral portions may be provided by bending the magnetic path forming member 200E on four sides, i.e., on the long sides and short sides. Alternatively, the magnetic path forming member 200E may be bent only on one long side and one short side and thereby being formed into an L-shape in cross-sectional view.

Also, the shape and positions of the lateral portions of the magnetic path forming member 200E are not limited to those described above, and may be selected as desired according to the direction and density of the magnetic flux. Variation 3-1, Variation 3-2, and Variation 3-3 of the present embodiment will be described below further.

Variation 3-1

Figure 27:
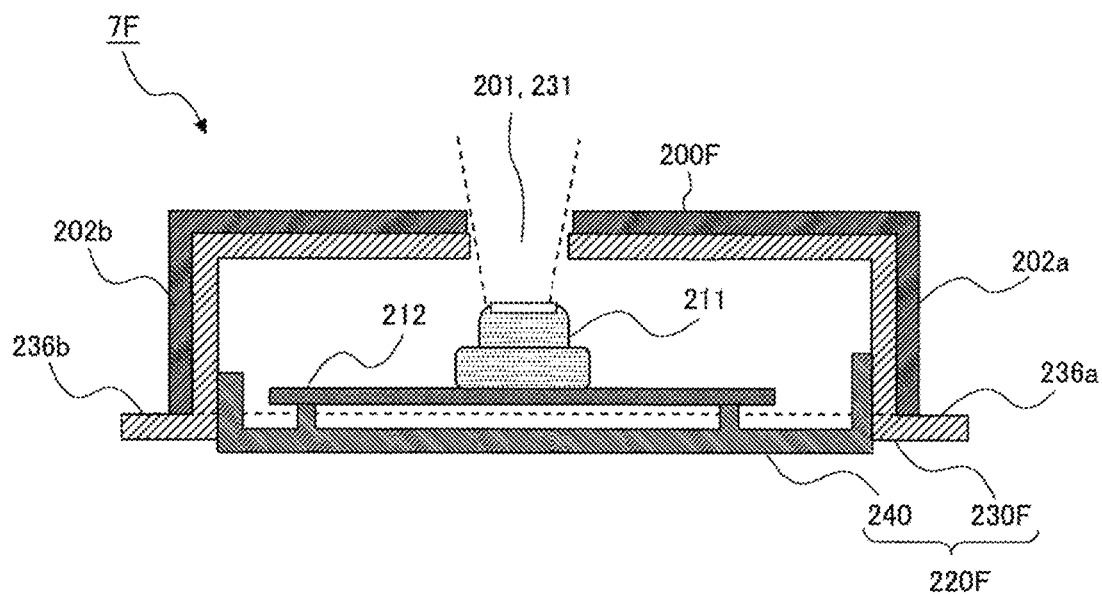
FIG. 27 is a cross-sectional view of a noncontact temperature sensor according to Variation 3-1.

FIG. 27 is a cross-sectional view of a noncontact temperature sensor 7F according to Variation 3-1. Also, in FIG. 27, the same components as those in FIG. 26 are denoted by the same reference numerals as the corresponding components in FIG. 26.

As shown in FIG. 27, lateral portions 202a and 202b of a magnetic path forming member 200F according to the present variation are formed in such a way as to extend below the substrate 212 of the infrared sensor unit 210. Also, side faces of an upper casing 230F according to the present variation are formed in such a way as to extend below the substrate 212 and the wings 236a and 236b are formed in end portions of the side faces to place the lateral portions 202a and 202b of the magnetic path forming member 200F thereon.

In this way, the present variation can reduce noise entering the substrate 212 through side faces of the sensor casing 220 and can further improve temperature detection accuracy.

Variation 3-2

Figure 28:
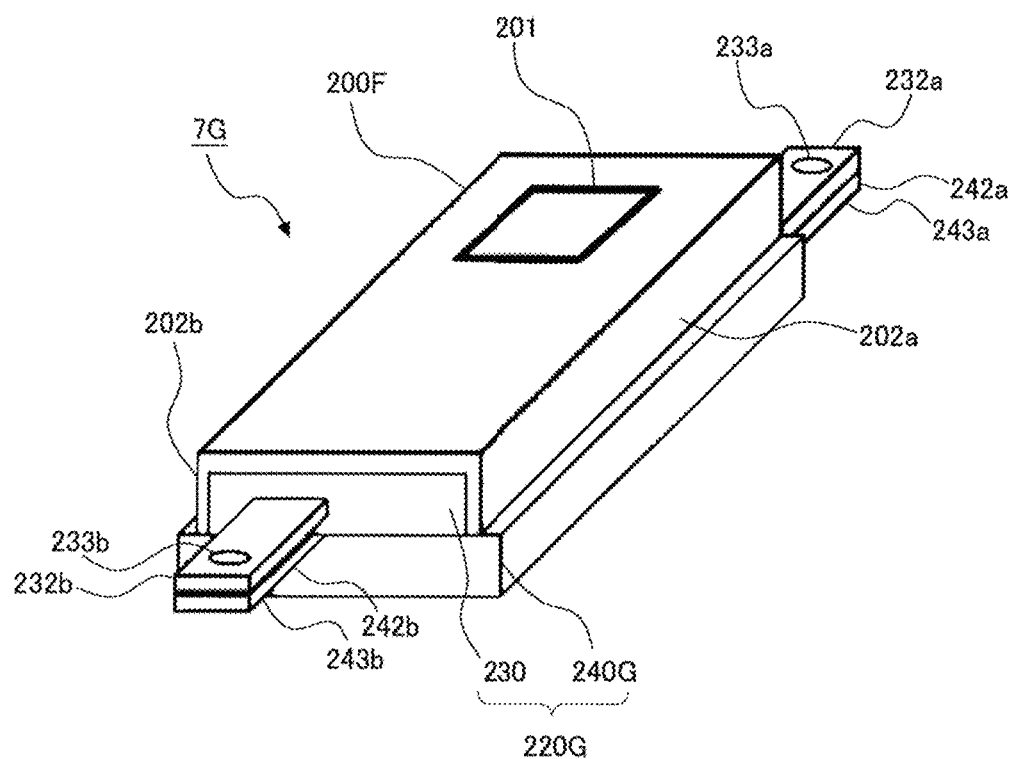
FIG. 28 is a perspective view of a noncontact temperature sensor according to Variation 3-2.
Figure 29:
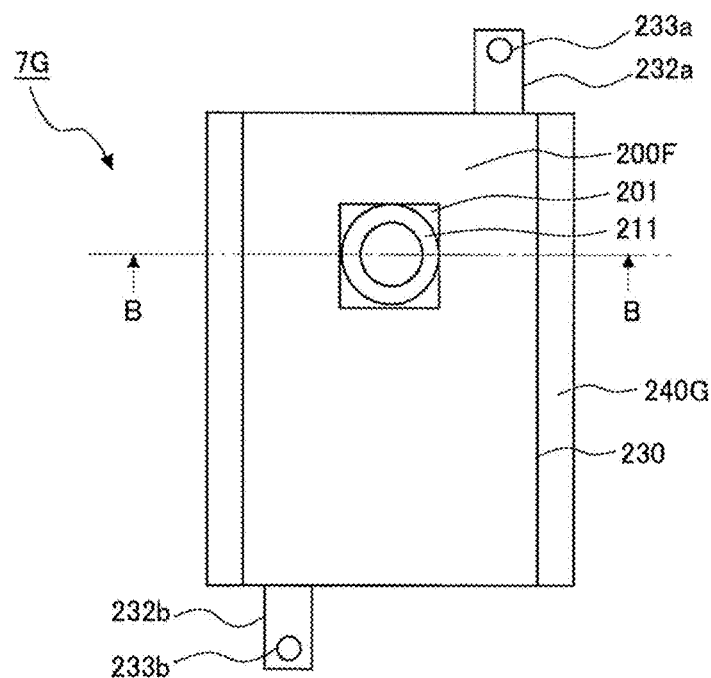
FIG. 29 is a plan view of the noncontact temperature sensor according to Variation 3-2.
Figure 30:
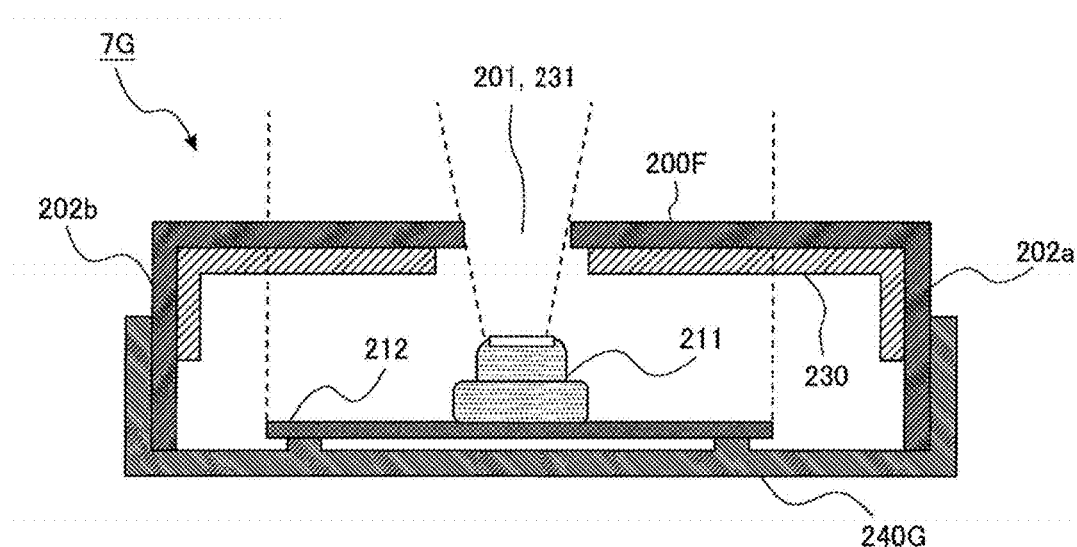
FIG. 30 is a cross-sectional view of the noncontact temperature sensor according to Variation 3-2 taken along line B-B of FIG. 29.

FIG. 28 is a perspective view of a noncontact temperature sensor 7G according to Variation 3-2 and FIG. 29 is a plan view of the noncontact temperature sensor 7G according to Variation 3-2. Also, FIG. 30 is a cross-sectional view of the noncontact temperature sensor 7G according to Variation 3-2 taken along line B-B of FIG. 29. In FIGS. 28 to 30, the same components as those in FIGS. 24 to 27 are denoted by the same reference numerals as the corresponding components in FIGS. 24 to 27.

As shown in FIGS. 28 to 30, a magnetic path forming member 200F of the present variation has a configuration similar to Variation 3-1 and includes lateral portions 202a and 202b extending below the substrate 212 of the infrared sensor unit 210. Also, a lower casing 240G of the present variation is larger on the short sides than an upper casing 230 in planar view and the lateral portions 202a and 202b of the magnetic path forming member 200F are housed inside the lower casing 240. That is, according to the present variation, the lateral portions 202a and 202b of the magnetic path forming member 200G are sandwiched between side faces of the upper casing 230 and side faces of the lower casing 240G.

As described above, the present variation can reduce noise entering the substrate 212 from side faces of the sensor casing 220 and allow the magnetic path forming member 200F to be placed stably.

Variation 3-3

Figure 31:
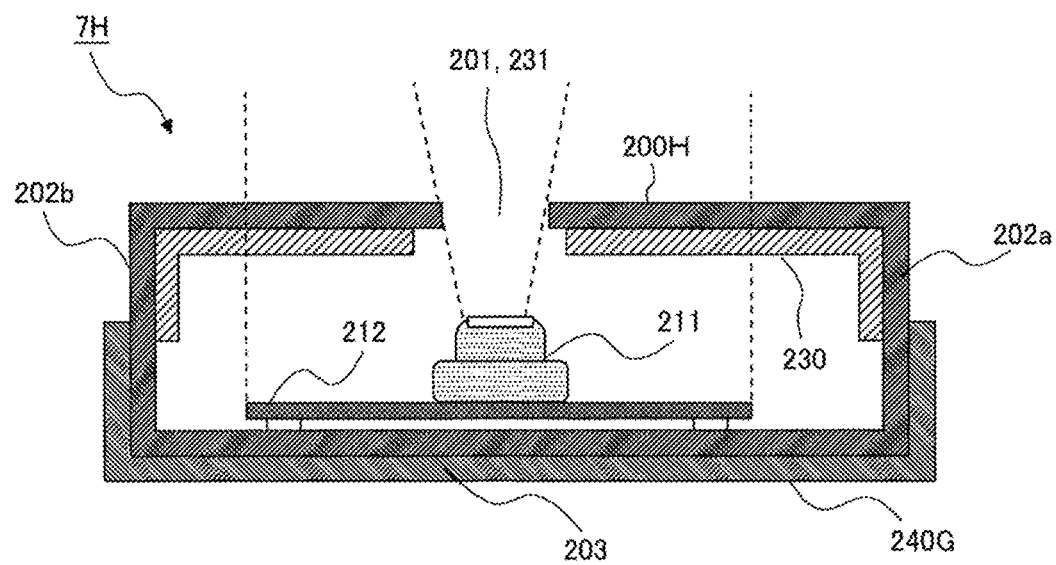
FIG. 31 is a cross-sectional view of a noncontact temperature sensor according to Variation 3-3.

FIG. 31 is a cross-sectional view of a noncontact temperature sensor 7H according to Variation 3-3. In FIG. 31, the same components as those in FIG. 30 are denoted by the same reference numerals as the corresponding components in FIG. 30.

As shown in FIG. 31, a magnetic path forming member 200H of the noncontact temperature sensor 7H according to the present variation includes a bottom portion 203 in addition to lateral portions 202a and 202b. The bottom portion 203 of the magnetic path forming member 200H is provided below the substrate 212 of the infrared sensor unit 210 in the lower casing 240G.

As described above, the present variation can reduce noise entering the substrate 212 through side faces and a bottom face of the sensor casing and allow the magnetic path forming member 200H to be placed stably.

Embodiment 4

Next, Embodiment 4 of the present invention will be described. A noncontact temperature sensor 7J of Embodiment 4 differs from Embodiment 1 in being further provided with a protection unit 260 configured to protect the magnetic path forming member. Other components and control of the induction cooker 1 are similar to those of Embodiment 1.

Figure 32:
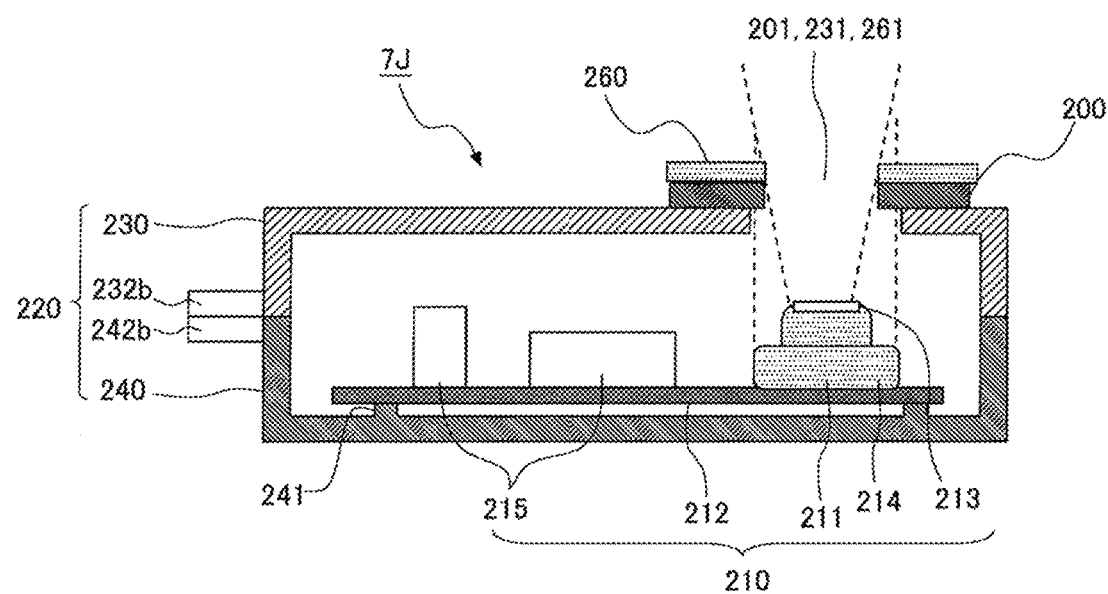
FIG. 32 is a longitudinal sectional view of a noncontact temperature sensor according to Embodiment 4.

FIG. 32 is a longitudinal sectional view of a noncontact temperature sensor 7J according to the present embodiment. In FIG. 32, the same components as those in FIG. 11 are denoted by the same reference numerals as the corresponding components in FIG. 11.

As shown in FIG. 32, the noncontact temperature sensor 7J of the present embodiment has the protection unit 260 on a top face of the magnetic path forming member 200. The protection unit 260 is a plate-like unit larger in area than the magnetic path forming member 200 in planar view and is placed covering the magnetic path forming member 200. Also, an opening 261 is provided in the protection unit 260 to allow the infrared sensor 211 to receive infrared radiation.

The protection unit 260 of the present embodiment is a metal element with high electrical conductivity. For example, an aluminum, copper, stainless steel, or iron plate can be adopted as the metal member, and desirably aluminum or copper, which is a nonmagnetic metal, is used by taking into consideration magnetoresistance performance.

As described above, according to the present embodiment, since the magnetic path forming member 200 is protected by the protection unit 260, even if the magnetic path forming member 200 is broken, it is possible to prevent scattering of broken members. Also, since a metal member with high electrical conductivity is used for the protection unit 260, magnetic flux entering the infrared sensor 211 through the top face can be reduced further by magnetic flux generated by an eddy current in the metal. Furthermore, the surface of the protection unit 260, which is a metal member, has high reflectivity, making it possible to reflect radiant heat coming from the top plate 3 and thereby lessen the impact of the radiant heat on the infrared sensor 211.

Note that the present embodiment is not limited to the above configuration, and various variations are possible. For example, the protection unit 260 may be a resin member rather than a metal member. Also, the protection unit 260 may have a shape other than a plate shape. For example, use of a mesh structure or punched structure will make it easy to radiate heat. Variation 4-1, Variation 4-2, and Variation 4-3 of the present embodiment will be described below further.

Variation 4-1

Figure 33:
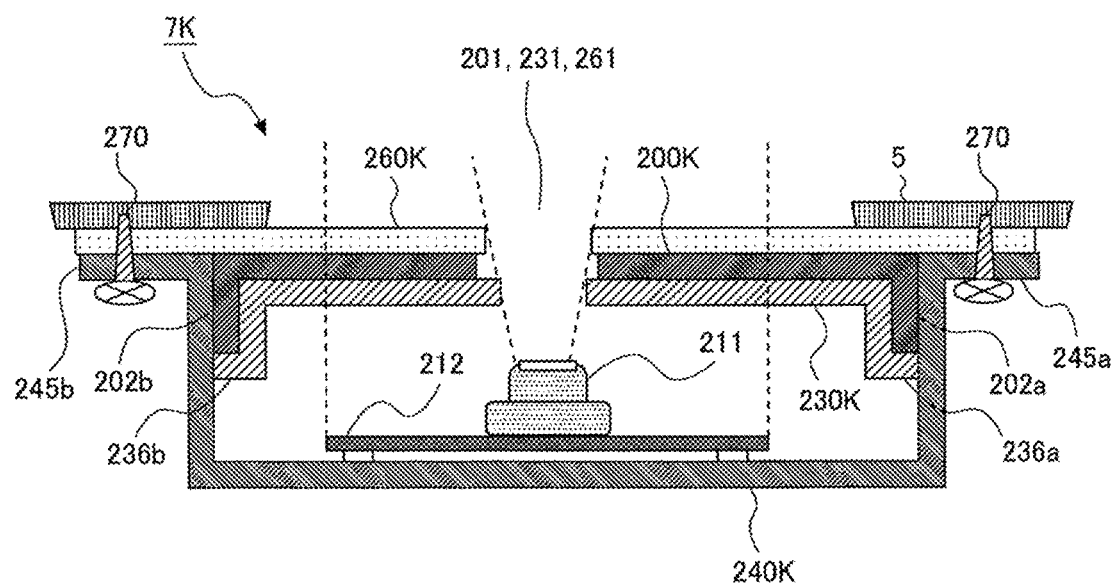
FIG. 33 is a cross-sectional view of a noncontact temperature sensor according to Variation 4-1.

FIG. 33 is a cross-sectional view of a noncontact temperature sensor according to Variation 4-1. In FIG. 33, the same components as those in FIG. 32 are denoted by the same reference numerals as the corresponding components in FIG. 32.

As shown in FIG. 33, a magnetic path forming member 200K of the present variation includes lateral portions 202a and 202b extending downward from a top face of an upper casing 230K and is placed on a top face and side faces of the magnetic path forming member 200K. Wings 236a and 236b are formed on the side faces of the upper casing 230K to place the lateral portions 202a and 202b thereon. According to the present variation, the upper casing 230K is placed inside a lower casing 240K and the lateral portions 202a and 202b of the magnetic path forming member 200K are sandwiched between side faces of the upper casing 230K and side faces of the lower casing 240K.

The side faces of the lower casing 240K extend to a top face of the magnetic path forming member 200K and a mount 245a and a mount 245b, protruding outward, are formed in end portions. Then, the protection unit 260K of the present variation is attached to the coil base 5 together with the lower casing 240K using screws 270.

According to the present variation, again, since the magnetic path forming member 200K is protected by the protection unit 260K, even if the magnetic path forming member 200 is broken, it is possible to prevent scattering of broken members.

Variation 4-2

Figure 34:
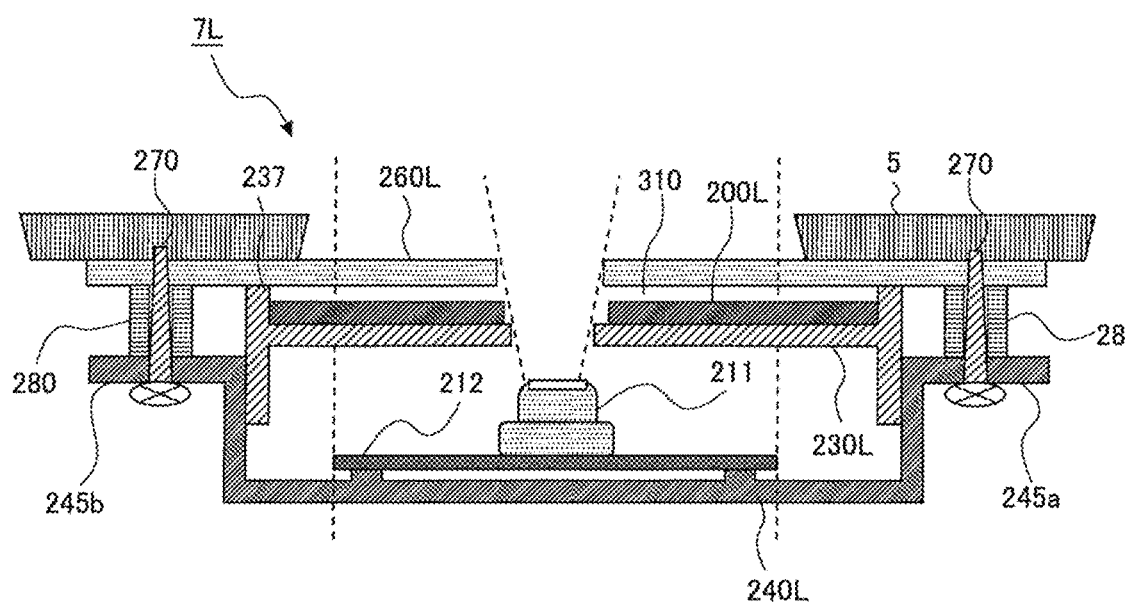
FIG. 34 is a cross-sectional view of a noncontact temperature sensor according to Variation 4-2.

FIG. 34 is a cross-sectional view of a noncontact temperature sensor 7L according to Variation 4-2. In FIG. 34, the same components as those in FIG. 33 are denoted by the same reference numerals as the corresponding components in FIG. 33. As shown in FIG. 34, a magnetic path forming member 200L of the present variation has a plate shape and is placed on a top face of an upper casing 230L. On the top face of the upper casing 230L, ribs 237 are formed along at least part of an outer periphery. The ribs 237 are configured to be thicker than the magnetic path forming member 200L, thereby forming a clearance 301 between a protection unit 260L and the magnetic path forming member 200L.

A mount 245a and a mount 245b, protruding outward, are formed at end portions on side faces of the lower casing 240L. Then, the protection unit 260L of the present variation is attached to the coil base 5 together with the lower casing 240L via spacers 280 using screws 270.

A clearance 301 provided between the protection unit 260K and the magnetic path forming member 200 as with the present variation improves durability of the magnetic path forming member 200L against vibration.

Variation 4-3

Figure 35:
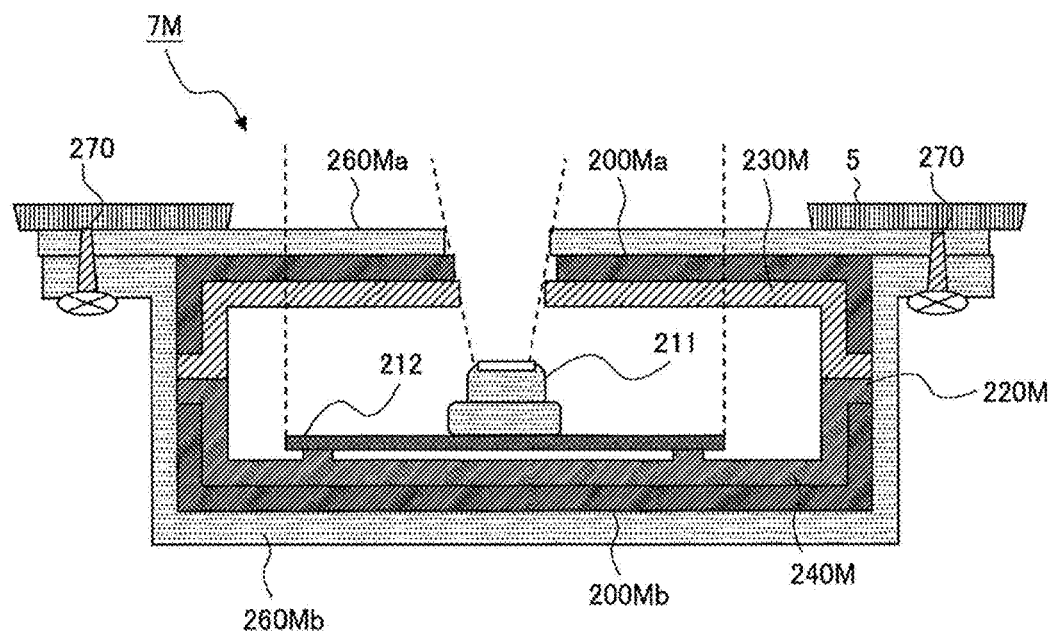
FIG. 35 is a cross-sectional view of a noncontact temperature sensor according to Variation 4-3.

FIG. 35 is a cross-sectional view of a noncontact temperature sensor 7M according to Variation 4-3. Also, in FIG. 35, the same components as those in FIG. 33 are denoted by the same reference numerals as the corresponding components in FIG. 33.

As shown in FIG. 35, the noncontact temperature sensor 7M according to the present variation includes an upper-side magnetic path forming member 200Ma configured to cover an exterior of an upper casing 230M and a lower-side magnetic path forming member 200Mb configured to cover an exterior of a lower casing 240M. The upper-side magnetic path forming member 200Ma is placed on a top face and side faces of the upper casing 230M and the lower-side magnetic path forming member 200Mb is placed on the outside of side faces and a bottom face of the lower casing 240M.

The noncontact temperature sensor 7M according to the present variation further includes an upper-side protection unit 260Ma configured to protect the upper-side magnetic path forming member 200Ma and a lower-side protection unit 260Mb configured to protect the lower-side magnetic path forming member 200Mb. The lower-side protection unit 260Mb houses the upper-side magnetic path forming member 200Ma, the lower-side magnetic path forming member 200Mb, and a sensor casing 220M. Also, a mount 261a and a mount 261b are formed on side faces of the lower-side protection unit 260Mb. Then, the upper-side protection unit 260Ma is attached to the coil base 5 together with the lower-side protection unit 260Mb using screws 270.

By placing the upper-side magnetic path forming member 200Ma and the lower-side magnetic path forming member 200Mb outside the sensor casing 220M, the present variation can simplify the sensor casing 220M. Also, by connecting one of the upper-side magnetic path forming member 200Ma and the lower-side magnetic path forming member 200Mb to ground, noise in the infrared sensor 211 can be reduced further. Note that the arrangement of the upper-side magnetic path forming member 200Ma and the lower-side magnetic path forming member 200Mb is not limited to the one shown in FIG. 35, and the magnetic path forming members may be placed effectively in locations highly subject to penetration of magnetic flux.

Whereas embodiments of the present invention and variations thereof are described above with reference to the accompanying drawings, detailed configurations of the present invention are not limited to those described above, and may be changed without departing from the spirit and scope of the invention. For example, an electromagnetic shielding sheet or an electromagnetic shield coating may be used as a magnetic path forming member. The electromagnetic shielding sheet is produced by kneading powder of a magnetic material such as Sendust or ferrite into a sheet made of silicon or other rubber, and the frequency for which the shielding sheet is effective varies with the magnetic material used. The principle of shielding is the same as metal, and the shielding is effective in a wide frequency range of a few hundred MHz to a few GHz. However, both the electromagnetic shielding sheet and the electromagnetic shield coating are effective as the magnetic path forming members as long as high relative permeability is available in the driving frequency band of induction cooker 1.

Also, the sensor casing according to any of the above embodiments may be adopted as a sensor casing for a photodiode infrared sensor affected by ambient light, an ultrasonic distance sensor whose oscillator becomes hot, a doppler distance sensor, a magnetic distance sensor, or an optical (laser) sensor. This can reduce the influence of magnetic fields on the sensor. Also, part of the sensor casing 220 may be formed integrally with the coil base 5.

Furthermore, the configurations of the above embodiments can be combined as appropriate. For example, the noncontact temperature sensors described in Embodiments 2 and 3 may be equipped with the protection unit described in Embodiment 4 and configured to protect the magnetic path forming member. Also, other variations, i.e., Variations 5 and 6, will be described below.

Variation 5

Figure 36:
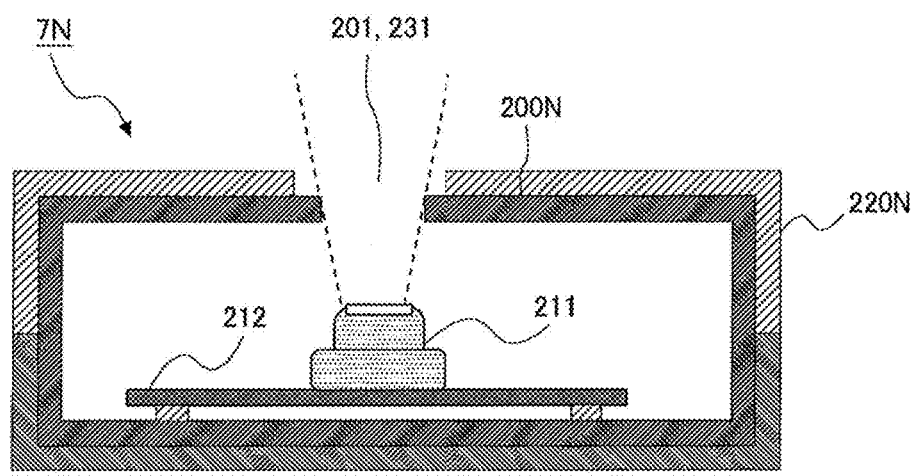
FIG. 36 is a cross-sectional view of a noncontact temperature sensor according to Variation 5.

FIG. 36 is a cross-sectional view of a noncontact temperature sensor 7N according to Variation 5. Also, in FIG. 36, the same components as those in FIG. 11 are denoted by the same reference numerals as the corresponding components in FIG. 11. As shown in FIG. 36, a magnetic path forming member 200N may be placed inside a sensor casing 220N. This reduces breakage of the magnetic path forming member 200N by external forces.

Variation 6

Figure 37:
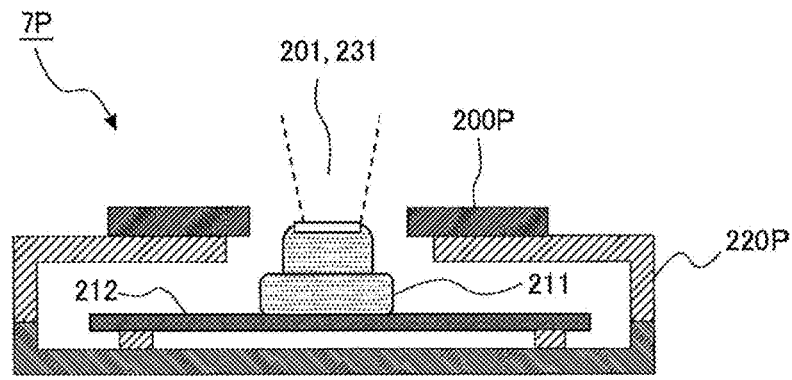
FIG. 37 is a cross-sectional view of a noncontact temperature sensor according to Variation 6.

FIG. 37 is a cross-sectional view of a noncontact temperature sensor 7P according to Variation 6. Also, in FIG. 37, the same components as those in FIG. 11 are denoted by the same reference numerals as the corresponding components in FIG. 11. As shown in FIG. 37, the infrared sensor 211 may be placed in such a way as to protrude upward from an opening 231 in a sensor casing 220P. In this case, a magnetic path forming member 200P is formed thicker than the protrusion of the infrared sensor 211. This configuration makes it possible to reduce a distance between the infrared sensor 211 and top plate 3 and thereby improve the sensitivity of the infrared sensor 211.

| Reference Signs List | |
|---|---|
| 1 | induction cooker |
| 2 | main body |
| 3 | top plate |
| 4 | heating coil |
| 4a | first coil |
| 4b | second coil |
| 4c | third coil |
| 5 | coil base |
| 6, 6a, 6b | ferrite core |
| 7, 7A, 7B, 7C, 7D, 7E, 7F, 7G, 7H, 7J, 7K, 7L, 7M, 7N, 7P | noncontact temperature sensor |

-continued

| Reference Signs List | |
|---|---|
| 8a, 8b, 8c, 8d | contact temperature sensor |
| 9 | temperature detection unit |
| 10 | control unit |
| 11 | commercial power supply |
| 12 | inverter |
| 21 | front operation panel |
| 22 | power switch |
| 23 | operation dial |
| 30 | cooking zone |
| 31 | top operation panel |
| 32 | heating power regulator |
| 33 | heating power indicator |
| 34 | display unit |
| 40 | transparent part |
| 51 | central portion |
| 52 | outer peripheral portion |
| 53, 53a, 53b | beam |
| 100 | cooking container |
| 200, 200A, 200D, 200E, 200F, 200G, 200H, 200K, 200L, 200N, 200P | magnetic path forming member |
| 200Ba | first magnetic path forming member |
| 200Bb | second magnetic path forming member |
| 200Ma | upper-side magnetic path forming member |
| 200Mb | lower-side magnetic path forming member |
| 201 | opening |
| 202a, 202b | lateral portion |
| 203 | bottom portion |
| 210 | infrared radiation sensor unit |
| 211 | infrared sensor |
| 212 | substrate |
| 213 | condensing lens |
| 214 | enclosing member |
| 215 | electronic component |
| 220, 220C, 220D, 220M, 220N, 220P | sensor casing |
| 230, 230C, 230D, 230E, 230F, 230K, 230L, 230M | upper casing |
| 231 | opening |
| 232a, 232b, 242a, 242b | mounting strip |
| 233a, 233b, 243a, 243b | insertion hole |
| 234, 235, 237 | rib |
| 236a, 236b | wing |
| 240, 240G, 240K, 240L, 240M | lower casing |
| 241 | support member |
| 245a, 245b | mount |
| 260, 260K, 260L | protection unit |
| 260Ma | upper-side protection unit |
| 260Mb | lower-side protection unit |
| 261 | opening |
| 261a, 261b | mount |
| 270 | screw |
| 280 | spacer |

The invention claimed is:

1. An induction cooker comprising:
   a top plate on which a cooking container is placed;
   a heating coil placed below the top plate and configured to heat the cooking container;
   a ferrite core placed below the heating coil;
   an infrared sensor placed below the heating coil and configured to detect infrared radiation emitted from the cooking container;
   a sensor casing including an upper casing and a lower casing, and configured to house the infrared sensor; and
   a magnetic path forming member placed on a top face of the sensor casing, the magnetic path forming member being a different component from the ferrite core.

2. The induction cooker of claim 1, wherein the magnetic path forming member is made of a material whose relative permeability in a driving frequency band of the induction cooker is higher than relative permeability of air.

3. The induction cooker of claim 1, wherein the magnetic path forming member is placed in parallel to a direction of the magnetic flux passing above the infrared sensor.

4. The induction cooker of claim 1, further comprising a substrate on which the infrared sensor is placed, wherein
   a length of the magnetic path forming member parallel to a direction of magnetic flux generated from the heating coil and passing above the substrate is longer than a length of the substrate parallel to the direction of the magnetic flux.

5. The induction cooker of claim 4, wherein:
   the magnetic path forming member is larger in area than the substrate in planar view and is placed covering the substrate; and
   an opening is formed in the magnetic path forming member to allow the infrared sensor to receive infrared radiation.

6. The induction cooker of claim 1, wherein:
   the magnetic path forming member is larger in area than the infrared sensor in planar view and is placed covering the infrared sensor; and
   an opening is formed in the magnetic path forming member to allow the infrared sensor to receive infrared radiation.

7. The induction cooker of claim 1, wherein:
   an opening is formed in a top face of the sensor casing to allow the infrared sensor to receive infrared radiation; and
   the magnetic path forming member includes a first magnetic path forming member and a second magnetic path forming member placed opposite to each other across the opening in the sensor casing.

8. The induction cooker of claim 1, wherein:
   a rib protruding toward the magnetic path forming member is formed on the top face of the sensor casing, and
   the magnetic path forming member is positioned by the rib.

9. The induction cooker of claim 8, wherein:
   an opening is formed in the top face of the sensor casing to allow the infrared sensor to receive infrared radiation; and
   the rib is formed along at least part of the opening in the sensor casing.

10. The induction cooker of claim 8, wherein the rib is formed along at least part of an outer periphery of the top face of the sensor casing.

11. The induction cooker of claim 1, wherein the magnetic path forming member includes a lateral portion placed along a side face of the sensor casing.

12. The induction cooker of claim 11, wherein a wing is formed on the side face of the sensor casing, and the lateral portion of the magnetic path forming member is formed on the wing.

13. The induction cooker of claim 11, further comprising a substrate on which the infrared sensor is placed; and
   the lateral portion of the magnetic path forming member extends below the substrate.

14. The induction cooker of claim 11, wherein:
   the lateral portion of the magnetic path forming member is sandwiched between the upper casing and the lower casing.

15. The induction cooker of claim 11, wherein the magnetic path forming member includes a bottom portion placed along an inner side of a bottom face of the sensor casing.

16. The induction cooker of claim 1, further comprising a protection unit placed on a top face or a bottom face of the magnetic path forming member and configured to protect the magnetic path forming member.

17. The induction cooker of claim 16, wherein the protection unit is made of a nonmagnetic metal with high electrical conductivity or a resin with high heat resistance.

18. The induction cooker of claim 1, wherein the magnetic path forming member is made of soft ferrite, hard ferrite, an electromagnetic shielding sheet, or electromagnetic shield coating.

19. The induction cooker of claim 1, wherein the magnetic path forming member is placed outside a side face and a bottom face of the sensor casing.

20. The induction cooker of claim 1, wherein the magnetic path forming member is configured to guide magnetic flux generated from the heating coil and passing above the infrared sensor.

21. The induction cooker of claim 1, wherein
the magnetic path forming member is made of magnetic material;
an opening is formed in a top face of the sensor casing to allow the infrared sensor to receive infrared radiation; and
the magnetic path forming member is placed so as to surround the opening in the sensor casing, or
the magnetic path forming member includes a first magnetic path forming member and a second magnetic path forming member placed opposite to each other across the opening in the sensor casing.

22. A sensor unit comprising:
a sensor;
a sensor casing includes an upper case and a lower case and configured to house the sensor; and
a magnetic path forming member having a plate shape and being directly fixed to a face of the sensor casing.

* * * * *